US010229478B2

United States Patent
Prasad et al.

(10) Patent No.: US 10,229,478 B2
(45) Date of Patent: Mar. 12, 2019

(54) IMAGE PROCESSING APPARATUS AND IMAGE PROCESSING METHOD

(71) Applicant: SAMSUNG ELECTRONICS CO., LTD., Suwon-si (KR)

(72) Inventors: Bindigan Hariprasanna Pawan Prasad, Bangalore (IN); Venkat Ramana Peddigari, Bangalore (IN); Gayathri Ramanujam, Bangalore (IN); Anurag Mithalal Jain, Bangalore (IN); Phanish Hanagal Srinivasa Rao, Bangalore (IN); Loka Sudharsan Reddy, Bangalore (IN); Divya Patidar, Bangalore (IN); Sreevatsa Dwaraka Bhamidipati, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/866,049

(22) Filed: Sep. 25, 2015

(65) Prior Publication Data
US 2016/0093023 A1   Mar. 31, 2016

(30) Foreign Application Priority Data

Sep. 26, 2014 (IN) ............... 4746/CHE/2014
Sep. 25, 2015 (KR) ........... 10-2015-0136990

(51) Int. Cl.
*G06T 3/40* (2006.01)
*G06F 3/0484* (2013.01)
(Continued)

(52) U.S. Cl.
CPC ........ *G06T 3/4053* (2013.01); *G06F 3/0486* (2013.01); *G06F 3/04842* (2013.01);
(Continued)

(58) Field of Classification Search
CPC ....... G06T 3/40; G06T 7/0012; G06T 3/4053; G06T 5/001; G06T 5/50; G06T 7/0042;
(Continued)

(56) References Cited

U.S. PATENT DOCUMENTS 9,124,858 B2    9/2015  Jang et al.
2007/0165103 A1*  7/2007  Arima ................. G06T 3/40
                                                  348/14.01
(Continued)

FOREIGN PATENT DOCUMENTS

KR   10-2010-0095833 A   9/2010
KR   10-2014-0044664 A   4/2014

OTHER PUBLICATIONS

International Search Report for PCT/KR2015/010259 dated Jan. 12, 2016 [PCT/ISA/210].
(Continued)

*Primary Examiner* — Jingge Wu
(74) *Attorney, Agent, or Firm* — Sughrue Mion, PLLC

(57) ABSTRACT

An image processing method, including preparing a first image; designating at least one region of interest (ROI) in the first image, generating restoration data; and generating a second image using the restoration data, the second image corresponding to the ROI, wherein a resolution of the second image is higher than a resolution of a region corresponding to the ROI in the first image.

29 Claims, 32 Drawing Sheets

(51) Int. Cl.
   *G06F 3/0486*   (2013.01)
   *G06K 9/18*     (2006.01)
   *G06T 5/00*     (2006.01)
   *G06T 5/50*     (2006.01)
   *G06K 9/32*     (2006.01)
   *G06K 9/00*     (2006.01)

(52) U.S. Cl.
   CPC ............. *G06K 9/18* (2013.01); *G06K 9/325* (2013.01); *G06K 9/3241* (2013.01); *G06T 5/001* (2013.01); *G06T 5/50* (2013.01); *G06K 9/00228* (2013.01); *G06T 2207/10016* (2013.01)

(58) Field of Classification Search
   CPC ..... G06F 3/04842; G06F 3/0486; G06K 9/18; G06K 9/3241; G06K 9/325
   See application file for complete search history.

(56) References Cited

U.S. PATENT DOCUMENTS

| | | | | |
|---|---|---|---|---|
| 2008/0002916 | A1* | 1/2008 | Vincent | G06K 9/3258 382/305 |
| 2008/0107346 | A1* | 5/2008 | Zhang | G06T 3/4053 382/215 |
| 2008/0292193 | A1 | 11/2008 | Bigioi et al. | |
| 2009/0092337 | A1* | 4/2009 | Nagumo | G06T 3/4053 382/299 |
| 2009/0202169 | A1* | 8/2009 | Hayashi | G06T 3/4092 382/264 |
| 2009/0207310 | A1* | 8/2009 | Arai | G06T 3/40 348/581 |
| 2009/0232213 | A1 | 9/2009 | Jia | |
| 2010/0034477 | A1* | 2/2010 | Crisan | G06T 3/4053 382/244 |
| 2010/0073546 | A1* | 3/2010 | Mori | G06T 11/60 348/333.12 |
| 2010/0079621 | A1 | 4/2010 | Jang | |
| 2010/0092038 | A1 | 4/2010 | Theodore et al. | |
| 2010/0123792 | A1* | 5/2010 | Nagumo | H04N 5/145 348/222.1 |
| 2010/0157107 | A1* | 6/2010 | Iijima | H04N 5/232 348/240.99 |
| 2010/0183245 | A1* | 7/2010 | Oryoji | G06T 3/4053 382/299 |
| 2011/0019026 | A1* | 1/2011 | Kameyama | G06K 9/00248 348/222.1 |
| 2011/0098056 | A1 | 4/2011 | Rhoads et al. | |
| 2011/0128367 | A1* | 6/2011 | Yoshioka | G06T 1/00 348/79 |
| 2011/0316884 | A1* | 12/2011 | Giambalvo | G06F 17/30058 345/660 |
| 2012/0189221 | A1* | 7/2012 | Inada | G06F 3/14 382/240 |
| 2013/0044962 | A1* | 2/2013 | Kim | G06T 3/4053 382/254 |
| 2013/0083026 | A1* | 4/2013 | Lethers | G06T 3/40 345/428 |
| 2013/0121588 | A1* | 5/2013 | Noguchi | H04N 19/17 382/195 |
| 2013/0265311 | A1 | 10/2013 | Na et al. | |
| 2014/0015926 | A1* | 1/2014 | Lu | H04N 13/0033 348/43 |
| 2014/0118405 | A1* | 5/2014 | Chand | G06T 3/40 345/661 |
| 2014/0375836 | A1* | 12/2014 | Amitay | G06T 5/00 348/222.1 |
| 2014/0376793 | A1* | 12/2014 | Lee | G06T 7/0012 382/131 |
| 2015/0130809 | A1* | 5/2015 | Tagami | G06T 3/40 345/428 |
| 2015/0200998 | A1* | 7/2015 | Gu | H04L 67/08 709/208 |
| 2015/0278993 | A1* | 10/2015 | Yamazaki | G06T 3/40 345/660 |
| 2015/0370876 | A1* | 12/2015 | Rickard | G06F 17/30572 707/758 |

OTHER PUBLICATIONS

Written Opinion for PCT/KR2015/010259 dated Jan. 12, 2016 [PCT/ISA/237].

Communication issued by the European Patent Office dated Aug. 24, 2017 in counterpart European Patent Application No. 15844507.2.

Min Kyu Park et al., "Super-Resolution Image Reconstruction: A Technical Review", IEEE Signal Processing Magazine, May 2003, pp. 21-36, vol. 20, No. 3, IEEE Service Center, Piscataway, NJ, US, XP011097476.

Communication dated Nov. 15, 2017, issued by the European Patent Office in counterpart European Patent Application No. 15844507.2.

* cited by examiner

IMAGE PROCESSING APPARATUS AND IMAGE PROCESSING METHOD

CROSS-REFERENCE TO RELATED APPLICATION

This application claims the benefit of Indian Patent Application No. 4746/CHE/2014, filed on Sep. 26, 2014, in the Indian Patent Office and Korean Patent Application No. 10-2015-0136990 filed on Sep. 25, 2015 in the Korean patent Office, the disclosure of which is incorporated herein in its entirety by reference.

BACKGROUND

1. Field

The present disclosure relates to image processing apparatuses and image processing methods for improving image quality when an enlarged image is displayed.

2. Description of the Related Art

With the developments of communication technologies and the miniaturization of electronic devices, personal terminals have come into wide use. In particular, in recent years, personal portable terminals, such as smart phones or smart tablets, have been widely used. In addition, with the developments of compact camera technologies and display technologies, most smart phones include camera modules and displays. Most digital cameras also include camera modules and displays.

The user may capture an image by using an electronic device, such as a smart phone or a digital camera, which includes a camera module and a display. The user may confirm the captured image by using the display included in the electronic device. In order to view an image in more detail, the user may perform a touch input corresponding to an enlargement of the image on the electronic device. The electronic device may display a partially enlarged image in response to the touch input.

If an image is enlarged in excess of an original resolution of the image, the quality of the displayed image may be deteriorated. For example, in a case where an original resolution of an image is 16 million pixels and a resolution of a display is 2 million pixels, a maximum enlargement magnification, which is capable of displaying an image without deterioration of the image quality, may be sqrt(16/2)=2.828. If such an image is enlarged in excess of 2.828 times, the image quality may be deteriorated by upscaling.

SUMMARY

Provided are image processing apparatuses and image processing methods capable of improving image quality when an enlarged image is displayed.

Provided are image processing apparatuses and image processing methods capable of reducing a size of an additional storage space required for improving the image quality.

Additional aspects will be set forth in part in the description which follows and, in part, will be apparent from the description, or may be learned by practice of the presented exemplary embodiments.

According to an aspect of an exemplary embodiment, an image processing method includes preparing a first image; designating at least one region of interest (ROI) in the first image, generating restoration data; and generating a second image using the restoration data, the second image corresponding to the ROI, wherein a resolution of the second image is higher than a resolution of a region corresponding to the ROI in the first image.

The first image may be a captured image of an object, and generating the restoration data may further include generating restoration data associated with the region corresponding to the ROI in the first image; and storing the first image and the restoration data.

The first image may be a preview image generated using light reflected from an object, preparing the first image may further include displaying the preview image on a display, and generating the restoration data may further include: capturing a third image of the object; generating the restoration data based on a region corresponding to the ROI in the third image; and storing the third image and the restoration data.

Generating the restoration data may further include: capturing a plurality of images of the object; and generating a super resolution image of the ROI using at least two images of the plurality of images.

Generating the restoration data may further include: generating comparison data indicating a difference between a region corresponding to the ROI in the third image and a region corresponding to the ROI in the super resolution image.

Generating the restoration data may further include: selecting at least one selected resolution, the selected resolution being greater than a resolution of a region corresponding to the ROI in the third image, and being less than or equal to a resolution of a region corresponding to the ROI in the super resolution image; upscaling the region corresponding to the ROI in the third image to the selected resolution and downscaling the region corresponding to the ROI in the super resolution image to the selected resolution; and generating comparison data associated with the selected resolution by comparing the region corresponding to the ROI in the third image and the region corresponding to the ROI in the super resolution image.

Designating the at least one ROI may further include: dividing the preview image into a plurality of regions; determining whether an object of interest (OOI) is included in the plurality of regions; and designating at least one of the plurality of regions as the ROI according to the determination result.

Designating the at least one ROI may further include: detecting a position of an object of interest (OOI) in the preview image by analyzing the preview image; detecting a region corresponding to the OOI by performing image segmentation using the detected position; and designating the detected region as the ROI.

Detecting the position of the OOI may further include at least one from among: detecting a position of a high frequency component in the preview image; detecting a position of a face by performing face recognition on the preview image; detecting a position of a text by performing optical character recognition (OCR) on the preview image; and detecting a position of a focus in the preview image.

Designating the at least one ROI may further include: receiving a drag input from a user; detecting a first region corresponding to the drag input in the preview image; receiving a tap input from a user; detecting a position corresponding to the tap input in the preview image; detecting a second region by performing image segmentation using the detected position; and designating the first region and the second region as the ROI.

Designating the at least one ROI may further include: detecting a position of an object of interest (OOI) in the preview image by analyzing the preview image; detecting a region corresponding to the OOI by performing image segmentation by using the detected position; displaying the detected region on the preview image; receiving a tap input from a user at the detected region; designating the detected region as a selected region according to the tap input; receiving a drag input from a user; detecting a third region corresponding to the drag input in the preview image; and designating the selected region and the third region as the ROI.

The method may further include displaying the stored third image and the region corresponding to the ROI in the third image; receiving an input from a user; determining an enlargement magnification based on a resolution of the display using the received input; generating an enlarged image of the third image using the enlargement magnification and the restoration data; and displaying the enlarged image.

Generating the enlarged image may further include: when the enlargement magnification is greater than 1 and less than a square root of a quotient obtained by dividing a resolution of the third image by a resolution of the display, generating the enlarged image by downscaling a portion of the third image to be displayed on the display; and when the enlargement magnification is substantially equal to the square root of the quotient obtained by dividing the resolution of the third image by the resolution of the display, generating the enlarged image by cropping a portion of the third image to be displayed on the display.

Generating the enlarged image may further include: when the enlargement magnification is greater than a square root of a first quotient obtained by dividing a resolution of the third image by a resolution of the display, and less than a product of the square root of the first quotient and a square root of a second quotient obtained by dividing a resolution of the region corresponding to the ROI in the super resolution image by a resolution of the region corresponding to the ROI in the third image, generating a partial image by upscaling a portion of the third image to be displayed on the display; and generating the enlarged image by synthesizing the restoration data with the partial image.

The generating of the enlarged image may further include: when the enlargement magnification is greater than a square root of a quotient obtained by dividing a resolution of the third image by a resolution of the display and less than a product of the square root of the quotient obtained by dividing the resolution of the third image by the resolution of the display and a square root of a quotient obtained by dividing a resolution of the region corresponding to the ROI in the super resolution image by a resolution of the region corresponding to the ROI in the third image, generating a first partial image by upscaling a first portion of the third image, the first portion corresponding to the ROI; generating a second partial image by upscaling a second portion of the third image, the second portion not corresponding to the ROI; generating a super resolution partial image by synthesizing the restoration data with the first partial image; and generating the enlarged image by combining the super resolution partial image with the second partial image.

The generating of the enlarged image may further include when the enlargement magnification is greater than a product of a square root of a quotient obtained by dividing a resolution of the third image by a resolution of the display and a square root of a quotient obtained by dividing a resolution of the region corresponding to the ROI in the super resolution image by a resolution of the region corresponding to the ROI in the third image, generating a partial image by upscaling a portion of the third image; generating a synthesized image by synthesizing the restoration data with the partial image; and generating the enlarged image by upscaling the synthesized image.

A non-transitory computer-readable recording medium may store a program for executing the method on a computer.

According to another aspect of an exemplary embodiment, an image processing method includes displaying a stored image, the stored image including a region corresponding to a region of interest (ROI); receiving an input from a user; determining an enlargement magnification using the received input; generating an enlarged image corresponding to the enlargement magnification using restoration data associated with the region corresponding to the ROI in the image; and displaying the enlarged image, wherein the enlarged image corresponds to the ROI, and wherein a resolution of the enlarged image is higher than a resolution of the region corresponding to the ROI in the stored image.

According to yet another aspect of an exemplary embodiment, an image processing apparatus includes: a light receiver configured to receive light reflected from an object; and a controller configured to prepare a first image using the received light, to designate at least one region of interest in the first image, to generate restoration data, and to generate a second image using the restoration data, the second image corresponding to the ROI, wherein a resolution of the second image is higher than a resolution of a region corresponding to the ROI in the first image.

The image processing apparatus may further include a storage, wherein the first image may be a captured image of the object, wherein the controller may be configured to generate restoration data associated with the region corresponding to the ROI in the first image, and wherein the storage may be configured to store the first image and the restoration data.

The image processing apparatus may further include: an image signal processor configured to generate a preview image using the received light; a display configured to display the preview image; and a storage, wherein the preview image is the first image, wherein the controller is further configured to control the light receiver and the image signal processor to capture a third image of the object, and to generate the restoration data based on a region corresponding to the ROI in the third image, and wherein the storage is configured to store the third image and the restoration data.

The restoration data may be a super resolution image of the ROI.

The restoration data may be comparison data indicating a difference between the region corresponding to the ROI in the third image and a region corresponding to the ROI in a super resolution image corresponding to the third image.

The controller may be further configured to select at least one selected resolution, the selected resolution being greater than a resolution of the region corresponding to the ROI in the third image, and less than or equal to a resolution of a region corresponding to the ROI in a super resolution image corresponding to the third image, to upscale the region corresponding to the ROI in the third image to the selected resolution, to downscale the region corresponding to the ROI in the super resolution image to the selected resolution, and to generate the restoration data associated with the selected resolution by comparing the region corresponding to the ROI in the third image and the region corresponding to the ROI in the super resolution image.

The controller may be configured to divide the preview image into a plurality of regions, to determine whether an object of interest (OOI) is included in the plurality of regions, and to designate at least one region of the plurality of regions as the ROI according to the determination result.

The controller may be configured to detect a position of an object of interest (OOI) in the preview image by analyzing the preview image, to detect a region corresponding to the OOI by performing image segmentation by using the detected position, and to designate the detected region as the ROI.

The image processing apparatus may further include an input interface configured to receive a drag input, wherein the controller is configured to detect a first region corresponding to the drag input in the preview image, the input interface is further configured receive a tap input, and the controller is further configured to detect a position corresponding to the tap input in the preview image, to detect a second region by performing image segmentation by using the detected position, and to designate the first region and the second region as the ROI.

The image processing apparatus may further include an input interface configured to receive an input, wherein the controller is configured to determine an enlargement magnification based on a resolution of the display by using the received input, and to generate an enlarged image of the third image by using the enlargement magnification and the restoration data, and the display is configured to display the generated enlarged image.

According to a further aspect of an exemplary embodiment, an image processing method includes capturing a plurality of burst images using a camera; selecting a preview image from among the plurality of burst images; designating a region of interest in the preview image; generating detail information corresponding to the region of interest, the detail information being generated from the plurality of burst images; generating a detail image based on the detail information; displaying the detail image on a display in response to a user input associated with the region of interest.

Designating the region of interest in the preview image may further include receiving a selection input from the user and designating the region of interest based on the selection input.

Designating the region of interest in the preview image may further include detecting an object of interest in the preview image and designating the region of interest based on the object of interest.

Generating detail information corresponding to the region of interest may further include selecting a comparison image from among the plurality of burst images, selecting a comparison region in the comparison image, the comparison region corresponding to the region of interest, performing a comparison between the comparison region and the region of interest, and generating the detail information based on the comparison.

According to a further aspect of an exemplary embodiment, an image processing method includes preparing a first image; designating at least one region of interest (ROI) in the first image; generating restoration data corresponding to the ROI using the first image; generating a compressed image by encoding the first image; storing the compressed image and the restoration data.

The image processing method may further include generating a restored image by restoring a region corresponding to the ROI in the compressed image using the restoration data, the restored image corresponding to the ROI; and displaying the restored image, wherein a resolution of the restored image is higher than a resolution of the region corresponding to the ROI in the compressed image.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
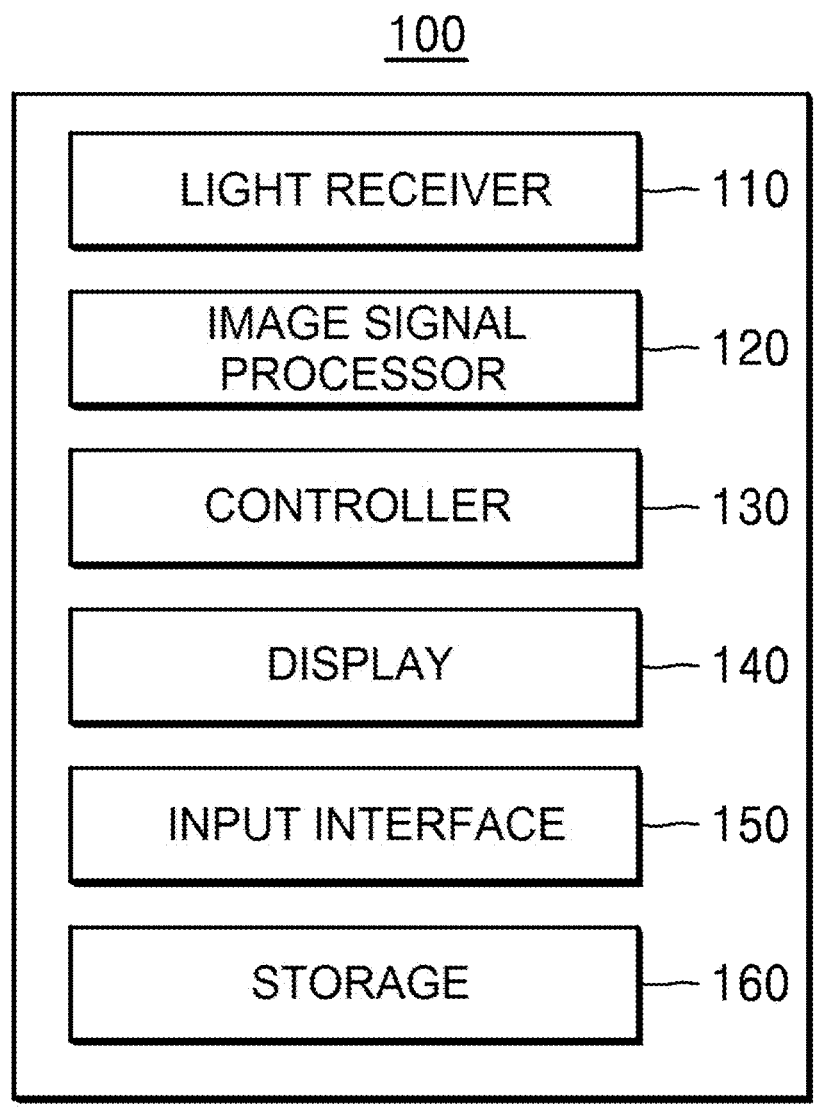
FIG. 1 is a block diagram of an image processing apparatus according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of" when preceding a list of elements, modify the entire list of elements and do not modify the individual elements of the list.

It will be understood that, although the terms "first", "second", "third", etc. may be used herein to describe various elements, these elements should not be limited by these terms. These terms are only used to distinguish one element from another. For example, a first element may be referred to as a second element, and similarly, a second element may be referred to as a first element without departing from the scope of the exemplary embodiments.

The terminology used herein is for the purpose of describing particular embodiments only and is not intended to be limiting of the inventive concept. As used herein, the singular forms "a", "an", and "the" are intended to include the plural forms as well, unless the context clearly indicates otherwise. It will also be understood that the terms "comprises", "includes", and "has", when used herein, specify the presence of stated elements, but do not preclude the presence or addition of other elements, unless otherwise defined.

Unless otherwise defined, all terms used in this specification will be construed as general meanings commonly understood by one of ordinary skill in the art. In addition, terms defined in a general dictionary will not be interpreted in an idealized or overly formal sense unless expressly so defined herein.

Hereinafter, an image processing apparatus 100 and an image processing method, according to exemplary embodiments, will be described in detail with reference to FIGS. 1 to 28.

FIG. 1 is a block diagram of an image processing apparatus 100 according to an exemplary embodiment. The image processing apparatus 100 may be a laptop computer, a smart phone, a smart tablet, a mobile terminal, a digital camera, a portable electronic device, or any other type of device as desired. Referring to FIG. 1, the image processing apparatus 100 may include a light-receiver 110, an image signal processor 120, a controller 130, a display 140, an input interface 150, and a storage 160.

The light receiver 110 may receive light reflected from an object. The light receiver 110 may photograph the object. The light receiver 110 may capture an image of the object. The light receiver 110 may capture photos, moving images, still images, burst images, or videos. The light receiver 110 may include a camera module, a lens, or an optical element. The light receiver 110 may include a charge-coupled device (CCD) image sensor or a complementary metal-oxide semiconductor (CMOS) image sensor.

The light receiver 110 may generate a raw image by using the received light. The raw image may be configured to have a Bayer format.

The image signal processor 120 may process the raw image. The image signal processor 120 may generate an RGB image by processing the raw image having the Bayer format. The image signal processor 120 may generate a preview image by processing the raw image. The image signal processor 120 may include an image signal processor.

The controller 130 may control the elements of the image processing apparatus 100 and the operation of the image processing apparatus 100. The controller 130 may perform an arithmetic operation. The controller 130 may process the image. The controller 130 may perform post-processing on the image. The controller 130 may analyze the image. The controller 130 may control the operation of the image processing apparatus 100 or control the image in response to a user input. The controller 130 may generate data by processing the preview image.

The controller 130 may execute one or more applications. The controller 130 may execute a camera application or a gallery application. The controller 130 may control the light receiver 110, the image signal processor 120, and the display 140 by using the camera application. The controller 130 may control the light receiver 110 to capture the image of the object by using the camera application. The controller 130 may control the display 140 to display the captured image by using the camera application.

The controller 130 may control the storage 160 and the display 140 by using the gallery application. The controller 130 may control the display 140 to display the image stored in the storage 160 by using the gallery application.

The controller 130 may be connected to the elements of the image processing apparatus 100. The controller 130 may be a central processing unit (CPU) or a microprocessor.

The display 140 may display the raw image processed by the image signal processor 120. The display 140 may display the preview image. The display 140 may display the image processed by the controller 130. The display 140 may display a screen. The display 140 may display a user interface. The display 140 may display another screen in response to a user input.

The display 140 may be a flat-panel display device, such as a liquid crystal display (LCD), an organic light-emitting diode (OLED), or a plasma display panel (PDP). In addition, the display 140 may be a curved display or a flexible display. The display 140 and the input interface 150 may be integrally configured like a touch screen, or may be separately configured.

The input interface 150 may receive an external input. The input interface 150 may receive an input from a user of the image processing apparatus 100. The input interface 150 may be a button, a touch screen, a track ball, a camera, a keyboard, a mouse, a fingerprint recognition device, or any other device as desired.

The input interface 150 may be a touch screen. The input interface 150 may receive a user touch input. Examples of the user touch input may include a tap input, a drag input, a swipe input, a slide input, a flick input, a pinch-in input, a pinch-out input, and a press-and-hold input.

The storage 160 may store the raw image generated by the light receiver 110, the image generated by the image signal processor 120, or the preview image. In addition, the storage 160 may store the image generated by the controller 130, or the data generated by the controller 130.

The storage 160 may be a volatile memory or a non-volatile memory. The storage 160 may be flash memory, read-only memory (ROM), random access memory (RAM), electrically erasable read-only memory (EEROM), erasable programmable read-only memory (EPROM), electrically erasable and programmable read-only memory (EEPROM), hard disk drive (HDD), a register, or any type of storage as desired. The storage 160 may include a file system, a database, or an embedded database.

Figure 2:
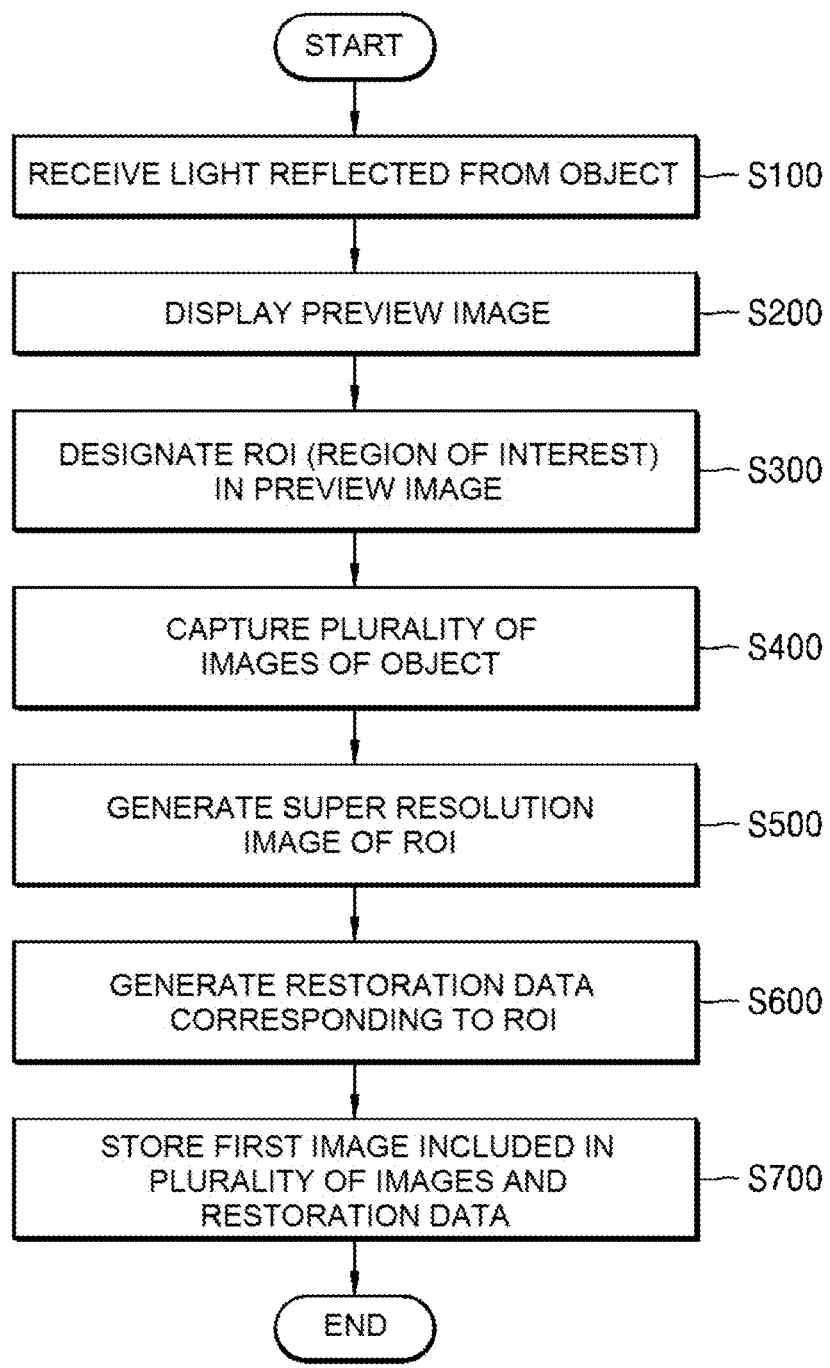
FIG. 2 is a flowchart of an image processing method according to an exemplary embodiment.

FIG. 2 is a flowchart of an image processing method according to an exemplary embodiment.

Referring to FIG. 2, in operation S100, light reflected from an object may be received. For example, the controller 130 may execute a camera application. The controller 130 may control the light receiver 110 by using the camera application. The light receiver 110 may receive the light reflected from the object. The light receiver 110 may generate a raw image by using the received light.

In operation S200, a preview image may be displayed by using the received light. The image signal processor 120 may generate the preview image by processing the raw image generated by using the received light. The preview image may display the image of the object in real time. The display 140 may display the generated preview image.

Figure 3:
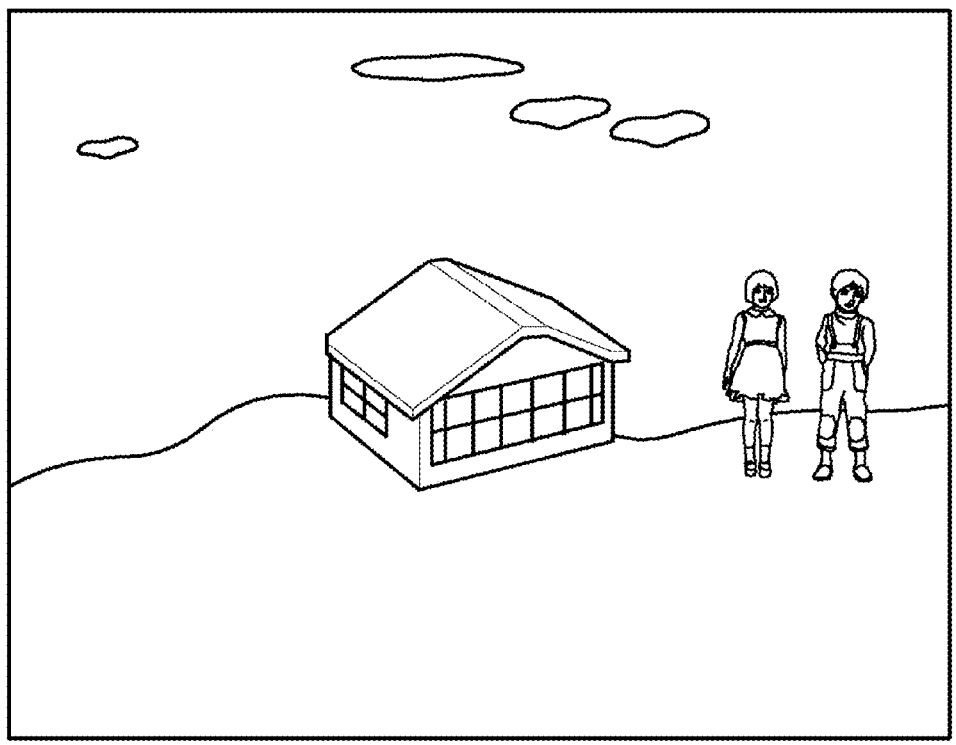
FIG. 3 is a diagram of a preview image displayed on an image processing apparatus, according to an exemplary embodiment.

FIG. 3 illustrates a preview image displayed on an image processing apparatus 100, according to an exemplary embodiment. Referring to FIG. 3, the preview image may include an image of one building and an image of two persons.

Referring to FIG. 2 again, in operation S300, at least one region of interest (ROI) may be designated in the preview image. The controller 130 may automatically designate at least one ROI by analyzing the preview image. In addition, the controller 130 may designate at least one ROI in response to a user input. Furthermore, the controller 130 may designate at least one ROI in response to a user touch input after an analysis result of the preview image is displayed on the display 140.

As a result, the controller 130 may display at least one ROI automatically, manually, or in a hybrid manner. A method of automatically designating at least one ROI will be described below with reference to FIG. 6. A method of manually designating at least one ROI will be described below with reference to FIG. 17. In addition, a method of manually designating at least one ROI in a hybrid manner will be described below with reference to FIG. 20.

The ROI may correspond to at least a portion of the preview image. When an image is captured and image processing is performed on the captured image, image processing may be performed on only a portion corresponding to the ROI, instead of the entire image. Accordingly, an amount of time necessary for the imaging processing may be reduced. In addition, a size of a memory necessary for the imaging processing may be reduced. Furthermore, a size of a storage space necessary for storing the result of the imaging processing may be reduced.

At least one ROI may be included in one image. The ROI may be one region defined by one closed curve.

Figure 4:
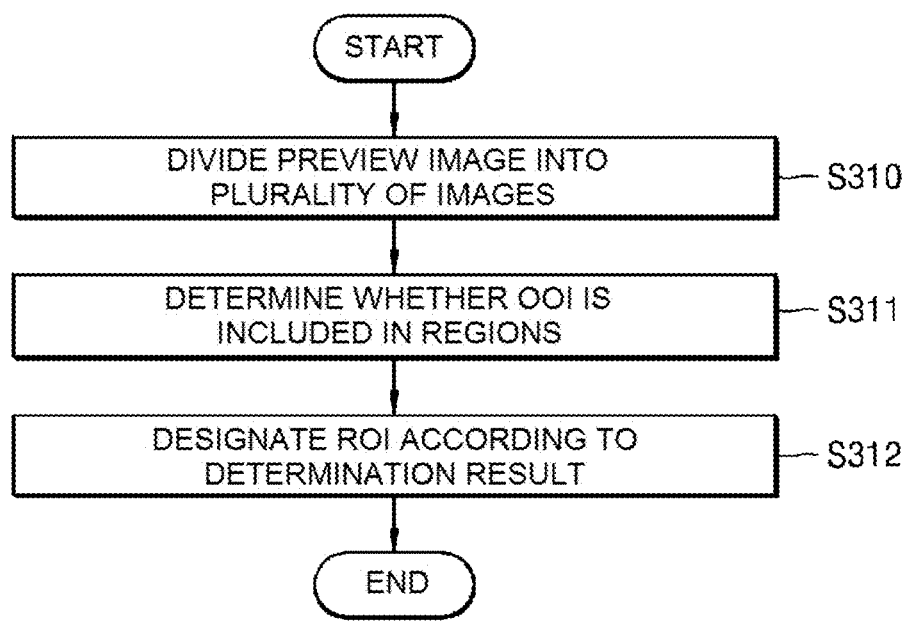
FIG. 4 is a flowchart of a process of designating a region of interest (ROI) in a preview image, according to an exemplary embodiment.

FIG. 4 is a flowchart of an example of operation S300 of designating the ROI in the preview image, according to an exemplary embodiment. Referring to FIG. 4, in operation S310, the preview image may be divided into a plurality of regions. The controller 130 may divide the preview image into the plurality of regions. The controller 130 may divide the preview image into two or more regions. The controller 130 may divide the preview image into a plurality of regions each having the same size. The controller 130 may divide the preview image into a plurality of regions having different sizes.

Figure 5:
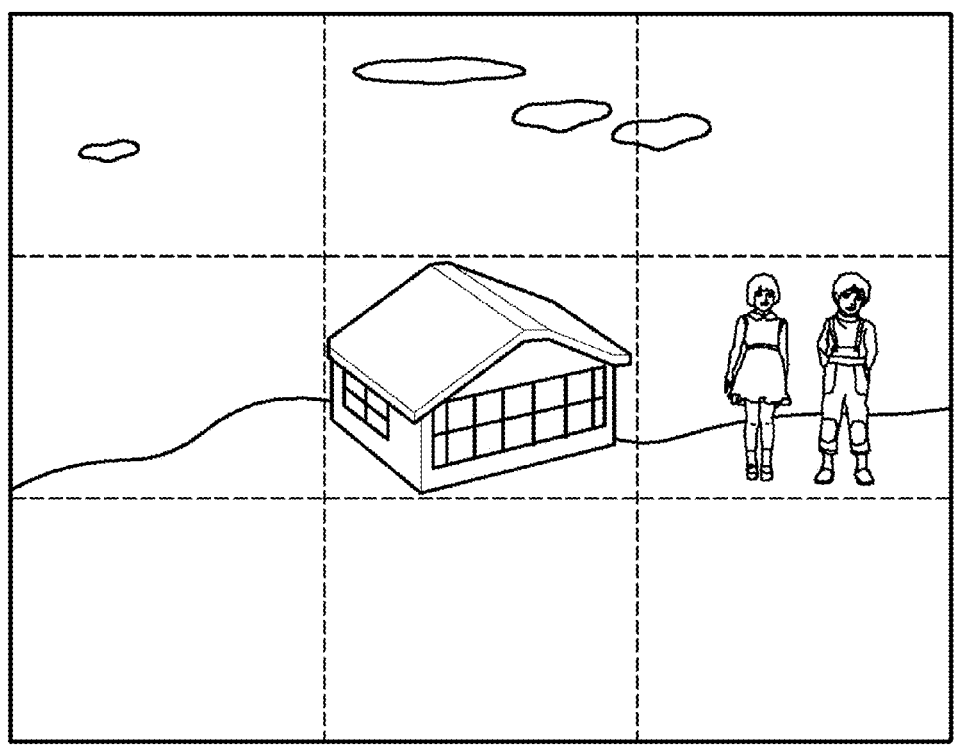
FIG. 5 is a diagram of a preview image divided into a plurality of regions, according to an exemplary embodiment.

FIG. 5 illustrates a preview image divided into the plurality of regions, according to an exemplary embodiment. As illustrated in FIG. 5, the controller 130 may equally divide the preview image of FIG. 3 into nine regions. A region of the second row and the second column among the regions of FIG. 5 may include an image of one building. A region of the second row and the third column among the regions of FIG. 5 may include an image of two persons.

Referring to FIG. 4 again, in operation S311, it may be determined whether an object of interest (OOI) is included in the respective divided regions. The controller 130 may analyze the divided images. The controller 130 may determine whether the OOI is included in the respective divided regions.

The OOI may be a predefined type of object. For example, a type of object, such as a building, a person, an animal, a plant, a product, or a natural phenomenon, may be predefined. The controller 130 may determine whether an object belonging to the predefined type is included in the respective divided regions.

Referring to FIG. 5, the controller 130 may determine that the OOI is included in two regions among the nine divided regions. The controller 130 may determine that the OOI is included in the region of the second row and the second column. In addition, the controller 130 may determine that the OOI is included in the region of the second row and the third column. The controller 130 may determine that the OOI is not included in the remaining seven regions.

Referring to FIG. 4 again, in operation S312, at least one of the plurality of regions may be designated as the ROI according to the determination result. The controller 130 may designate the region, which is determined as including the OOI, as the ROI. Referring to FIG. 5, the controller 130 may designate the region of the second row and the second column as the ROI. In addition, the controller 130 may designate the region of the second row and the third column as the ROI. The controller 130 may not designate the remaining seven regions as the ROI, or may designate the remaining seven regions as not the ROI.

Figure 6:
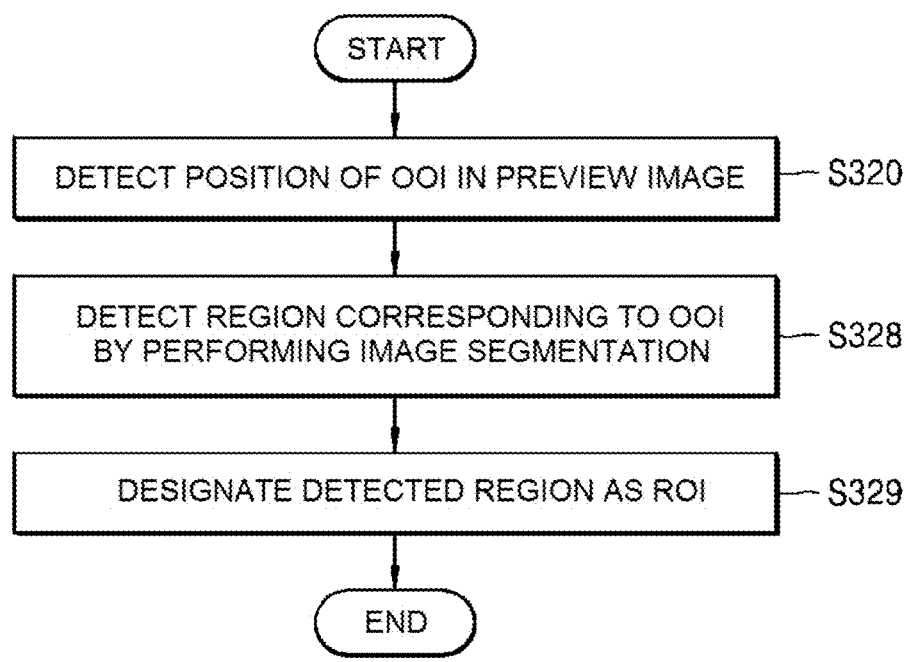
FIG. 6 is a flowchart of a process of designating an ROI in a preview image, according to another exemplary embodiment.

FIG. 6 is a flowchart of an example of operation S300 of designating the ROI in the preview image, according to another exemplary embodiment. Referring to FIG. 6, in operation S320, the preview image may be analyzed to detect a position of the OOI therein. The controller 130 may analyze the preview image. The controller 130 may detect the position of the OOI in the preview image.

As the method of detecting the position of the OOI, the controller 130 may detect a position of a high frequency component in the preview image, or may detect a position of a face by performing face recognition on the preview image. In addition, as a method of detecting the position of the OOI, the controller 130 may detect a position of a text by performing optical character recognition (OCR) on the preview image, or may detect a position of a focus in the preview image.

The controller 130 may use all the above-mentioned methods to detect the position of the OOI. In addition, the display 130 may use some of the above-mentioned methods. The method of detecting the position of the OOI may be changed according to user preferences. The user preferences associated with the method of detecting the position of the OOI may be pre-stored in the storage 160. In other words, the method to be used by the controller 130 in order to detect the position of the OOI may be predefined in the storage 160.

Figure 7:
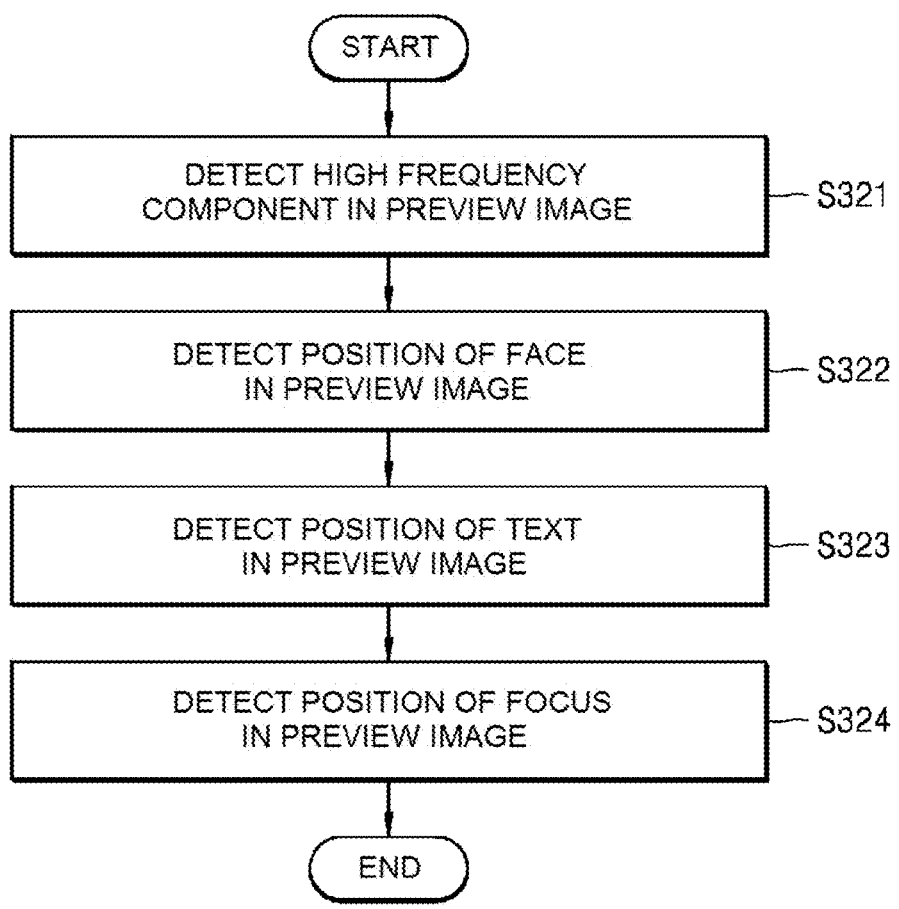
FIG. 7 is a flowchart of a process of detecting a position of an object of interest (OOI) in a preview image, according to an exemplary embodiment.

FIG. 7 is a flowchart of an example of operation S320 of detecting the position of the OOI in the preview image, according to an exemplary embodiment. Referring to FIG. 7, in operation S321, the position of the high frequency component may be detected in the preview image. The controller 130 may determine whether the high frequency component is included in the preview image. When it is determined that the high frequency component is included in the preview image, the controller 130 may detect the position of the high frequency component in the preview image.

Figure 8:
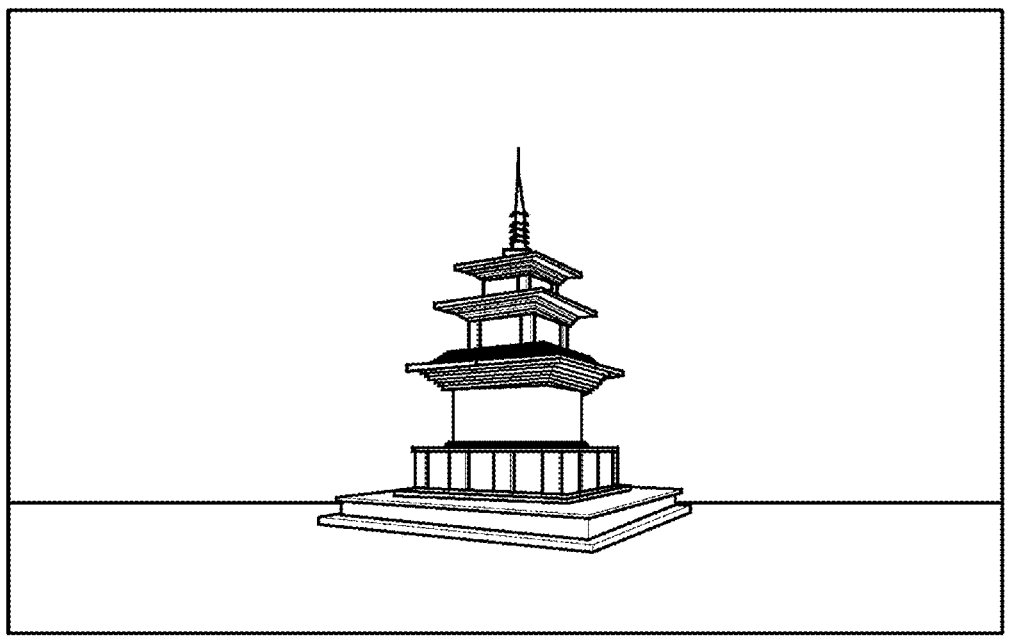
FIG. 8 illustrates a preview image according to another exemplary embodiment.
Figure 9:
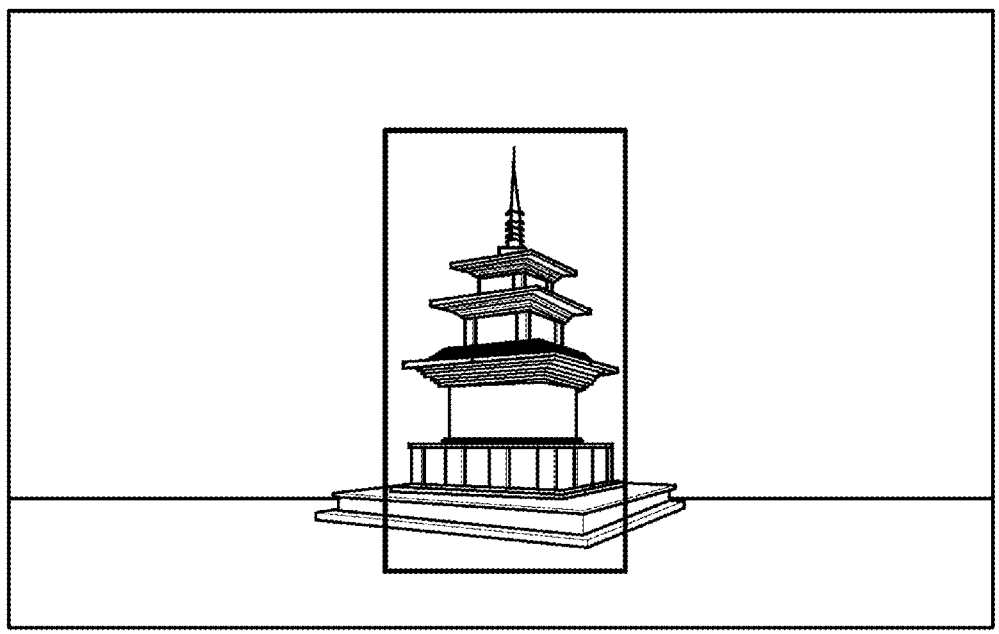
FIG. 9 illustrates a screen showing a result obtained by detecting a position of a high frequency component in a preview image and performing image segmentation thereon, according to an exemplary embodiment.

FIG. 8 illustrates a preview image according to another exemplary embodiment. Referring to FIG. 8, an image of a sculpture is included as, or corresponds with, a high frequency component in a middle portion of the preview image. In addition, the remaining portions excluding the image of the sculpture in the preview image may be, or may correspond with, a low frequency component. The controller 130 may determine that the high frequency component is included in the preview image of FIG. 8. In addition, the controller 130 may detect a position of the sculpture in the preview image. FIG. 9 illustrates a screen showing a result obtained by detecting the position of the high frequency component in the preview image of FIG. 8 and performing image segmentation thereon.

Referring to FIG. 7 again, in operation S322, the position of a face may be detected by performing face recognition on the preview image. The controller 130 may determine whether a face is included in the preview image by performing face recognition on the preview image. When it is determined that a face is included in the preview image, the controller 130 may detect the position of the face in the preview image.

Figure 10:
FIG. 10 illustrates a preview image according to another exemplary embodiment.
Figure 11:
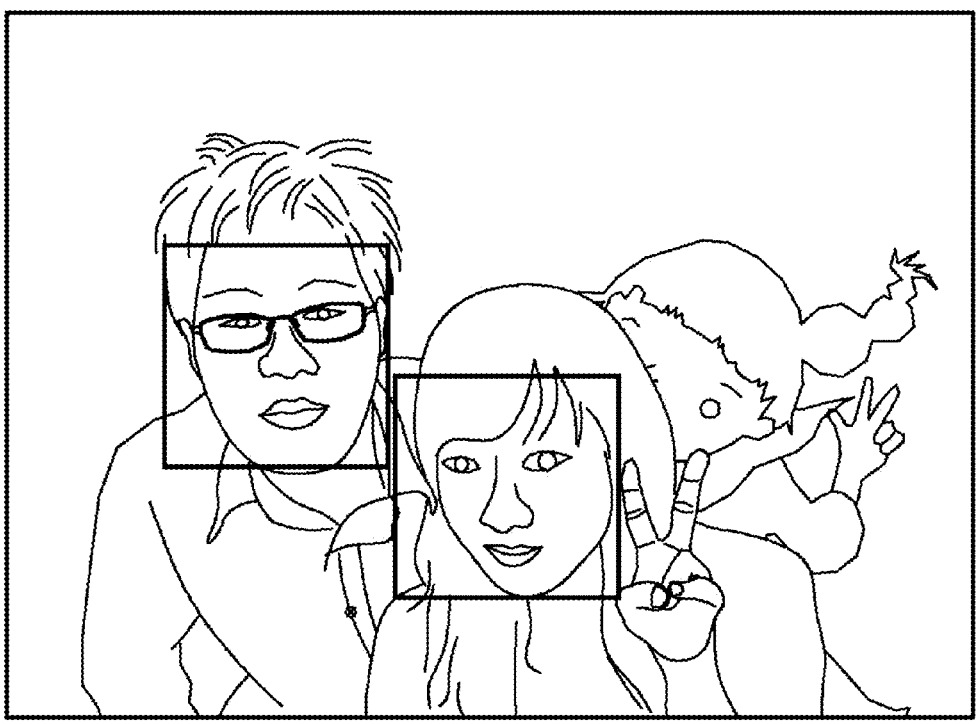
FIG. 11 illustrates a screen showing a result obtained by detecting a position of a face in a preview image and performing image segmentation thereon, according to an exemplary embodiment.

FIG. 10 illustrates a preview image according to another exemplary embodiment. Referring to FIG. 10, an image of three persons is included in the preview image. Referring to FIG. 10, a portion of a face disposed farthest to the right is covered with a face disposed in the center. The controller 130 may determine that a face is included in the preview image of FIG. 10. In addition, the controller 130 may detect a position of the face in the preview image. Referring to FIG. 10, the controller 130 may detect the position of the face disposed farthest to the left and the position of the face disposed in the center. In some exemplary embodiments, the controller 130 may fail to recognize the face that is disposed farthest to the right while being partially covered. Therefore, the controller 130 may not detect the position of the face disposed farthest to the right. FIG. 11 illustrates a screen showing a result obtained by detecting the position of the face in the preview image of FIG. 10 and performing image segmentation thereon.

Referring to FIG. 7 again, in operation S323, the position of a text may be detected by performing OCR on the preview image. The controller 130 may determine whether a text is included in the preview image by performing the OCR on the preview image. When it is determined that a text is included in the preview image, the controller 130 may detect the position of the text in the preview image.

Figure 12:
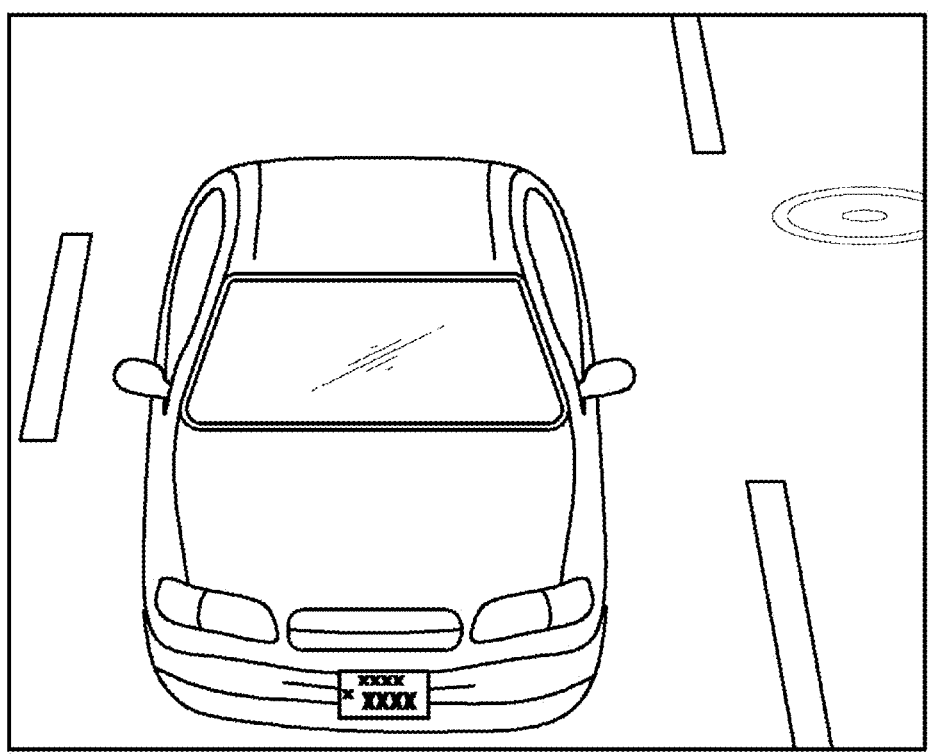
FIG. 12 illustrates a preview image according to another exemplary embodiment.
Figure 13:
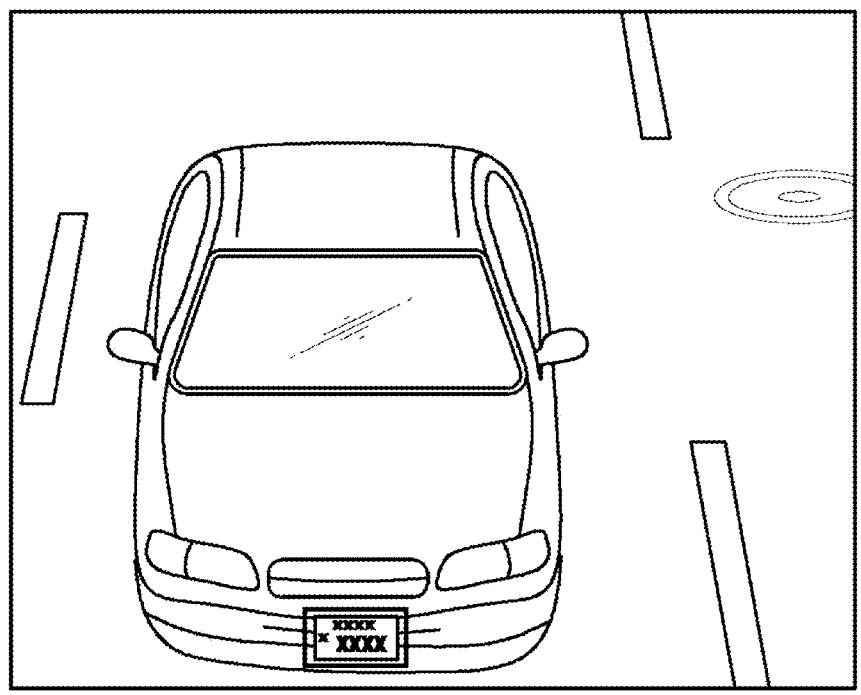
FIG. 13 illustrates a screen showing a result obtained by detecting a position of a text in a preview image and performing image segmentation thereon, according to an exemplary embodiment.

FIG. 12 illustrates a preview image according to another exemplary embodiment. Referring to FIG. 12, an image of a vehicle and an image of a vehicle identification number are included in the preview image. The controller 130 may determine that the text is included in the preview image of FIG. 12. In addition, the controller 130 may detect the position of the text in the preview image. Referring to FIG. 12, the controller 130 may detect the position of the image of the vehicle identification number. FIG. 13 illustrates a screen showing a result obtained by detecting the position of the text in the preview image of FIG. 12 and performing image segmentation thereon.

Referring to FIG. 7 again, in operation S324, the position of a focus, or an area of focus, in the preview image may be detected. The controller 130 may detect the position of the focus in the preview image.

Figure 14:
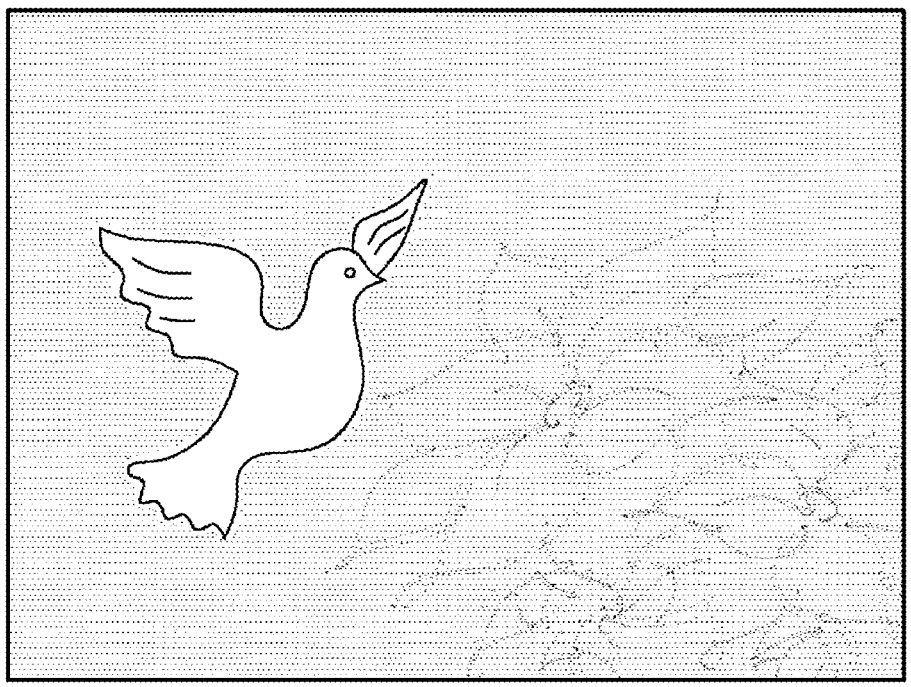
FIG. 14 illustrates a preview image according to another exemplary embodiment.
Figure 15:
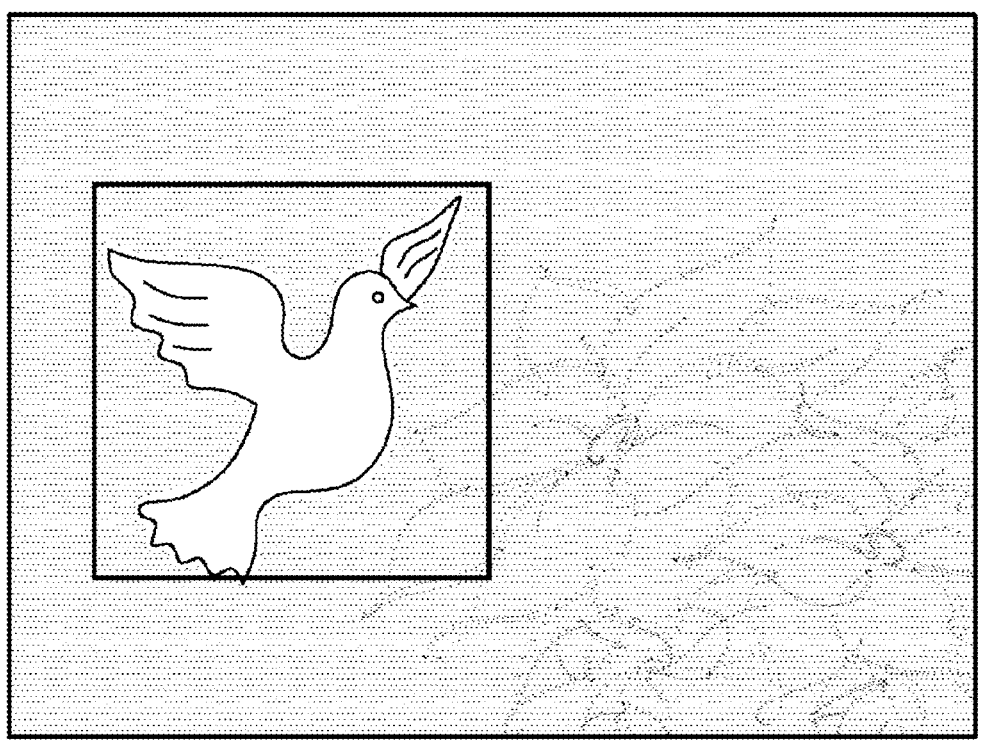
FIG. 15 illustrates a screen showing a result obtained by detecting a position of a focus in a preview image and performing image segmentation thereon, according to an exemplary embodiment.

FIG. 14 illustrates a preview image according to another exemplary embodiment. Referring to FIG. 14, an image of a bird and an image of leaves are included in the preview image. In the preview image, the bird is focused, which can mean that the bird is in focus, or included in an area of focus. Therefore, in the preview image, the image of the bird may be clear and the image of the leaves may be blurred. The controller 130 may detect the position of the focus in the preview image of FIG. 14. Referring to FIG. 14, the controller 130 may detect the position of the image of the bird. FIG. 15 illustrates a screen showing a result obtained by detecting the position of the focus in the preview image of FIG. 14 and performing image segmentation thereon.

Referring to FIG. 6 again, in operation S328, the region corresponding to the OOI may be detected by performing image segmentation by using the detected position of the OOI. The controller 130 may perform the image segmentation by using the detected position of the OOI. As a result of the image segmentation, the region corresponding to the OOI may be detected. FIGS. 9, 11, 13, and 15 illustrate screens showing detection results of the region corresponding to the OOI in the preview image, according to exemplary embodiments.

Figure 16:
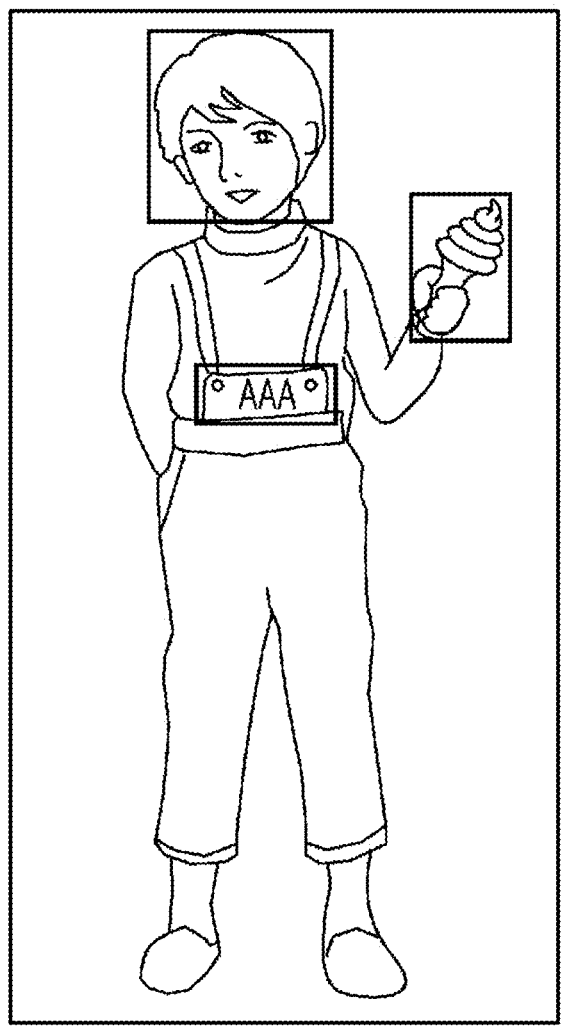
FIG. 16 illustrates a screen showing a detection result of a region corresponding to an OOI in a preview image, according to another exemplary embodiment.

According to another exemplary embodiment, as the method of detecting the position of the OOI with respect to one preview image, two or more of the above-described methods may be simultaneously used. For example, it is assumed that an image of an ice cream, an image of a person's face, and an image of a text written on clothes the person wears are all included in one preview image as high frequency components. The controller 130 may detect all of the image of the ice cream, the image of the person's face, and the image of the text as the OOI. FIG. 16 illustrates a screen showing a detection result of a region corresponding to an OOI in a preview image, according to another exemplary embodiment.

Referring to FIG. 6 again, in operation S329, the detected region may be designated as the ROI. The controller 130 may designate a region corresponding to the OOI as the ROI.

Figure 17:
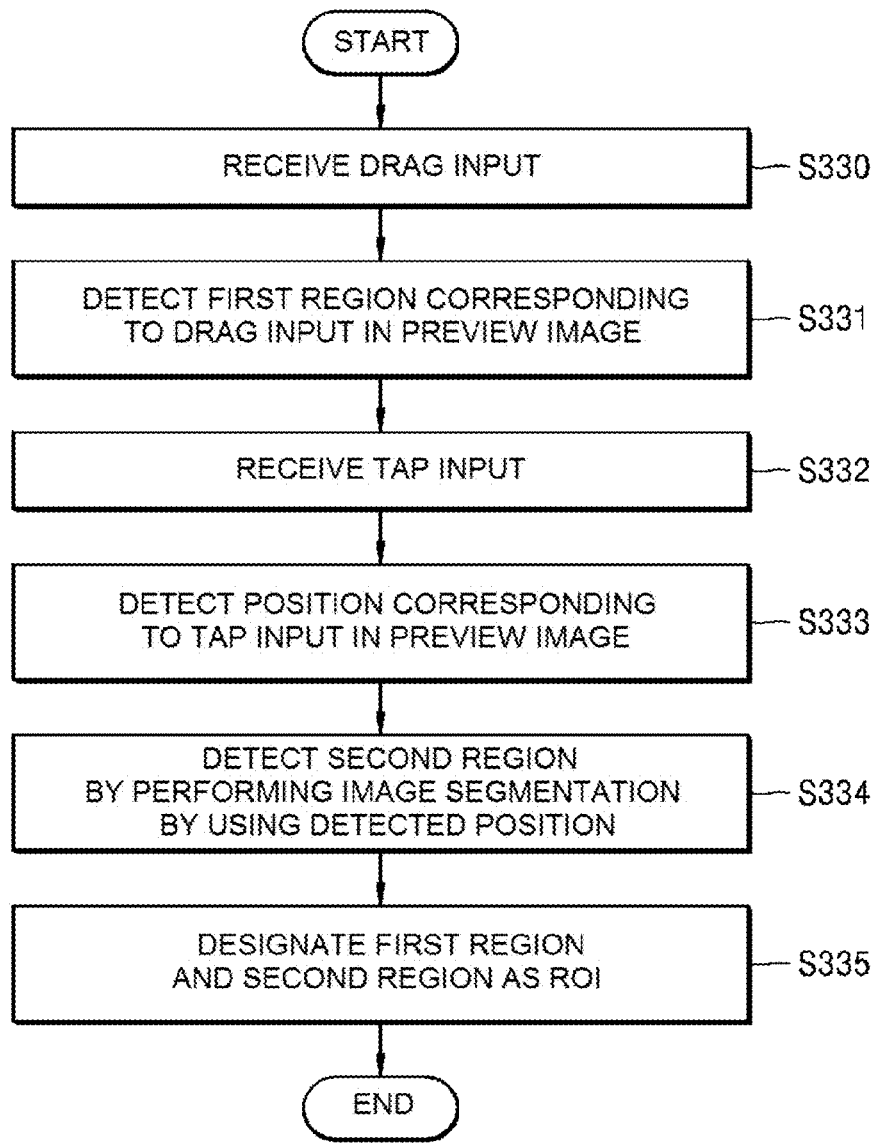
FIG. 17 is a flowchart of a process of designating an ROI in a preview image, according to another exemplary embodiment.

FIG. 17 is a flowchart of an example of operation S300 of designating the ROI in the preview image, according to another exemplary embodiment. Referring to FIG. 17, in operation S330, a drag input may be received from a user.

The user may directly designate a desired ROI. The user may designate a boundary line of the desired ROI through the drag input. The input interface 150 may receive the drag input from the user.

Figure 18:
FIG. 18 illustrates a preview image according to another exemplary embodiment.

FIG. 18 illustrates a preview image according to another exemplary embodiment. Referring to FIG. 18, an image of two birds, an image of three flowers, and an image of leaves are included in the preview image. The user may perform a drag input along an outline of the image of two birds.

Referring to FIG. 17 again, in operation S331, a first region corresponding to the drag input may be detected in the preview image. The controller 130 may detect the region corresponding to the drag input in response to the drag input. The controller 130 may generate a closed curve based on the drag input. The controller 130 may designate a region defined by the closed curve as the region corresponding to the drag input.

Figure 19:
FIG. 19 illustrates a screen showing a result obtained when an ROI is designated in a preview image in response to a user input, according to an exemplary embodiment.

FIG. 19 illustrates a screen showing a result obtained when an ROI is designated in the preview image of FIG. 18 in response to a user input. Referring to FIG. 19, the controller 130 may designate a region defined by the outline of the image of two birds as the region corresponding to the drag input.

Referring to FIG. 17 again, in operation S332, a tap input may be received from the user. The user may directly designate a position of a desired OOI. The user may designate the position of the desired OOI through the tap input. The input interface 150 may receive the tap input from the user. For example, referring to FIG. 18, the user may want to designate the flower disposed at a right upper portion of the preview image and the flower disposed at a left lower portion of the preview image as OOI. The user may perform the tap inputs on the image of the flower disposed at the right upper portion of the preview image and the image of the flower disposed at the left lower portion of the preview image.

Referring to FIG. 17 again, in operation S333, a position corresponding to the tap input may be detected in the preview image. The controller 130 may detect the position corresponding to the tap input in response to the tap input. Referring to FIG. 18, the controller 130 may detect the position of the image of the flower disposed at the right upper portion of the preview image and the position of the image of the flower disposed at the left lower portion of the preview image.

Referring to FIG. 17 again, in operation S334, a second region may be detected by performing image segmentation by using the detected position. The controller 130 may perform the image segmentation by using the detected position. As a result of the image segmentation, a region expanded from the detected position may be detected. Referring to FIG. 19, the controller 130 may detect the region corresponding to the flower by performing the image segmentation by using the position of the image of the flower disposed at the right upper portion of the preview image. In addition, the controller 130 may detect the region corresponding to the flower by performing the image segmentation by using the position of the image of the flower disposed at the left lower portion of the preview image.

Referring to FIG. 17 again, in operation S335, the first region and the second region may be designated as the ROI. The controller 130 may designate the first region detected in response to the drag input and the second region detected by the tap input as the ROI.

Figure 20:
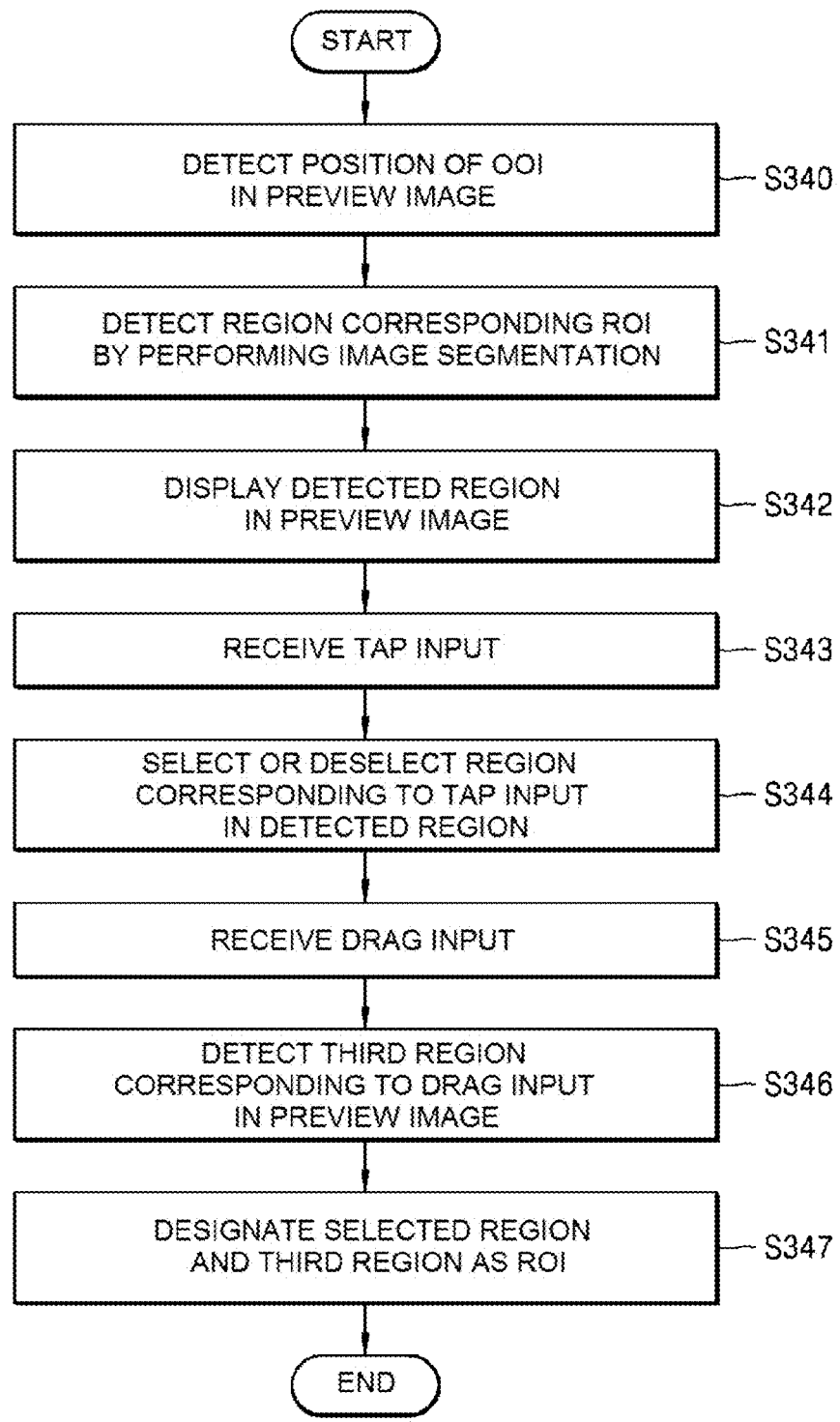
FIG. 20 is a flowchart of a process of designating an ROI in a preview image, according to another exemplary embodiment.

FIG. 20 is a flowchart of an example of operation S300 of designating the ROI in the preview image, according to another exemplary embodiment. Referring to FIG. 20, in operation S340, the preview image may be analyzed to detect a position of the OOI therein.

The controller 130 may analyze the preview image. The controller 130 may detect the position of the OOI in the preview image. As the method of detecting the position of the OOI, the controller 130 may detect a position of a high frequency component in the preview image, or may detect a position of a face by performing face recognition on the preview image. In addition, as the method of detecting the position of the OOI, the controller 130 may detect a position of a text by performing optical character recognition (OCR) on the preview image, or may detect a position of a focus in the preview image.

For example, referring to FIG. 18, the controller 130 may detect the image of the bird disposed in the center of the preview image, the image of the flower disposed at the right upper portion of the preview image, and the image of the flower disposed at the left lower portion of the preview image as the OOI. The controller 130 may not detect the image of the flower disposed at the left lower portion of the preview image and the image of the leaves disposed at the right lower portion of the preview image as the OOI.

Referring to FIG. 20 again, in operation S341, the region corresponding to the OOI may be detected by performing image segmentation by using the detected position of the OOI. The controller 130 may perform the image segmentation by using the detected position of the OOI. As a result of the image segmentation, the region corresponding to the OOI may be detected.

Figure 21:
FIG. 21 illustrates a screen showing a result obtained when a region corresponding to an OOI is displayed on a preview image, according to an exemplary embodiment.

In operation S342, the detected region may be displayed on the preview image. The display 140 may display the detected region on the preview image. FIG. 21 illustrates a screen showing a result obtained when the region corresponding to the OOI is displayed on the preview image of FIG. 18. Referring to FIG. 21, the display 140 may display the region corresponding to the image of the bird on the preview image. In addition, the display 140 may display the region corresponding to the image of the flower disposed at the right upper portion on the preview image. Furthermore, the display 140 may display the region corresponding to the image of the flower disposed at the left upper portion on the preview image.

Referring to FIG. 20 again, in operation S343, a tap input may be received from the user. After confirming the regions displayed on the display 140, the user may want to designate the regions of at least some of the displayed regions as the ROI. According to another exemplary embodiment, the user may not want to designate all the displayed regions as the ROI. The user may perform a tap input on the region which the user wants to designate as the ROI among the displayed regions.

For example, referring to FIG. 21, the user may want to designate, as the ROI, the region corresponding to the image of the flower disposed at the right upper portion of the preview image among the displayed regions. The user may perform a tap input on a position inside the region corresponding to the image of the flower disposed at the right upper portion of the preview image.

In addition, the user may reconsider, and may not want to designate the tapped region as the ROI. The user may perform a tap input again on the tapped region.

In addition, the user may want to additionally designate, as the ROI, regions corresponding to at least some objects disposed in the remaining regions other than the regions displayed on the display 140. The user may perform a tap input on an object corresponding to a region which the user wants to additionally designate as the ROI.

For example, referring to FIG. 21, the user may want to additionally designate, as the ROI, the region corresponding to the image of the flower disposed at the left lower portion of the preview image among the objects disposed in the remaining regions other than the displayed regions. The user may perform a tap input on the flower disposed at the left lower portion of the preview image.

Referring to FIG. 20 again, in operation S344, the region corresponding to the tap input among the detected regions may be selected or deselected. The controller 130 may select or deselect the region corresponding to the tap input among the detected images in response to the tap input. Referring to FIG. 21, the controller 130 may select the region corresponding to the flower disposed at the right upper portion of the preview image among the detected regions in response to the tap input performed on the flower disposed at the right upper portion of the preview image. In addition, the controller 130 may additionally select the region corresponding to the flower disposed at the left lower portion of the preview image in response to the tap input performed on the flower disposed at the left lower portion of the preview image.

When the tap input on the flower disposed at the left upper portion of the preview image is additionally received, the controller 130 may additionally select the region corresponding to the flower disposed at the left upper portion of the preview image. When a tap input on the flower disposed at the right upper portion of the preview image is received again, the controller 130 may deselect the region corresponding to the flower disposed at the right upper portion of the preview image.

Referring to FIG. 20 again, in operation S345, a drag input may be received from the user. The user may input a boundary line of the desired ROI by performing a drag input. The input interface 150 may receive the drag input from the user. For example, referring to FIG. 21, the user may perform the drag input along the outline of the image of two birds.

Referring to FIG. 20 again, in operation S346, a third region corresponding to the drag input may be detected in the preview image. The controller 130 may detect the region corresponding to the drag input in response to the drag input. The controller 130 may generate a closed curve based on the drag input. The controller 130 may designate a region defined by the closed curve as the region corresponding to the drag input. Referring to FIG. 21, the controller 130 may designate a region defined by the outline of the image of two birds as the region corresponding to the drag input.

Referring to FIG. 20 again, in operation S347, the selected region and the third region may be designated as the ROI. The controller 130 may designate, as the ROI, the region selected in response to the tap input and the third region detected in response to the drag input.

FIG. 19 illustrates a screen showing a result of the ROI designation. As compared with the screen of FIG. 21, the regions selected in response to the tap input on the flower disposed at the right upper portion and the tap input on the flower disposed at the left lower portion may be designated as ROI. In addition, the third region detected in response to the drag input performed along the outline of the image of two birds may be designated as ROI.

Next, the controller 130 may capture a first image of the object, and generate restoration data of a region corresponding to the ROI in the first image. According to another exemplary embodiment, differently from the order of the operations in the embodiment disclosed above, the controller 130 may capture a first image of the object, and then designate at least one ROI in the first image. The controller 130 may designate the ROI in the captured first image in a similar process illustrated in FIG. 4. The controller 130 may generate a restoration data of a region corresponding to the ROI in the first image.

A resolution of the restoration data may be higher than a resolution of a region corresponding the ROI in the first image. A second image restored using the restoration data may correspond to the ROI, and a resolution of the second image may be higher than a resolution of a region corresponding to the ROI in the first image.

For example, the restoration data may be a super resolution image of the ROI. The super resolution image may be an image that is restored using a plurality of images having a lower resolution and, and may have a higher resolution. A relational expression between the low-resolution images and the high-resolution images may be calculated by analyzing a frequency by using a relative difference between the plurality of images having a low resolution. The high-resolution image may be restored by using the calculated relational expression. The resolution of the super resolution image may be, for example, four times the resolution of the low-resolution image. For example, when the resolution of the original image is 16 million pixels, the resolution of the super resolution image restored by using the original image may be 64 million pixels.

According to another exemplary embodiment, the controller 130 may capture a first image or load a first image stored in advance in the storage 160. The controller may designate at least one ROI in the first image. The controller 130 may generate restoration data corresponding to the ROI using the first image. For example, the controller 130 may crop a region corresponding to the ROI in the first image to a separate image. The controller 130 may use the cropped region as the restoration data. The controller 130 may generate a compressed image by encoding the first image in JPEG format. As the first image is encoded or compressed, some of image information included in the first image may be lost in the compressed image. A resolution of the compressed image may be lower than a resolution of the first image.

The storage 160 may store the compressed image and the restoration data. The controller 130 may generate a restored image by restoring a region corresponding to the ROI in the compressed data using the restoration data. The display 140 may display the restored image. The restored image may correspond to the ROI, and a resolution of the restored image may be higher than a resolution of a region corresponding to the ROI in the compressed image. The image information lost in the compression process may be restored by restoring the compressed image using the restoration data. The compressed image of a lower resolution may be restored to an image of a higher resolution. The resolution of the restored image may be same as or similar to the resolution of the first image.

According to another exemplary embodiment, an image processing may be operated as illustrated in each of FIG. 29 to FIG. 32.

According to another exemplary embodiment, the restoration data may be compared data indicating a difference between the region corresponding to the ROI in the first image and the region corresponding to the ROI in the super resolution image corresponding to the first image. The controller 130 may generate the restoration data through the following process.

Referring to FIG. 2 again, in operation S400, a plurality of images of the object may be captured. The controller 130 may control the light receiver 110 and the image signal processor 120 to capture the plurality of images of the object. The controller 130 may capture burst images with respect to the object. For example, the controller 130 may capture ten burst images. The object included in the preview image may be the same as the object included in the captured burst images. The captured burst images may be temporarily stored in the storage 160.

In operation S500, a super resolution image of the ROI may be generated by using at least some of the plurality of images. The controller 130 may use at least some of the plurality of images. For example, the controller 130 may use five or more of the ten burst images. The controller 130 may generate the super resolution image of the ROI by using the images.

Instead of generating the super resolution image of all of the regions of the image, the controller 130 may generate the super resolution image of only the region corresponding to the ROI. The controller 130 may analyze the frequency by using a relative difference between the regions corresponding to the ROI in the plurality of captured images. The controller 130 may generate the super resolution image of the ROI by using the analysis result. The generated super resolution image may be temporarily stored in the storage 160.

In operation S600, restoration data may be generated, the restoration data indicating a difference between the region corresponding to the ROI in the first image included in the plurality of images and the region corresponding to the ROI in the super resolution image. The controller 130 may select any one of the plurality of images as the first image. The controller 130 may extract the region corresponding to the ROI in the first image. The controller 130 may generate restoration data indicating a difference between the region extracted from the first image and the region corresponding to the ROI in the super resolution image.

However, the resolution of the region extracted from the first image may be different from the resolution of the region corresponding to the ROI in the super resolution image. Therefore, in order to generate the restoration data, the controller 130 make the resolution of the extracted from the first image be substantially equal to the resolution of the region corresponding to the ROI in the super resolution image. The controller 130 may upscale the region extracted from the first image or may downscale the region corresponding to the ROI in the super resolution image. The controller 130 may perform the upscaling or the downscaling by using bicubic interpolation.

The controller 130 may select at least one of resolutions that are greater than the resolution of the region extracted from the first image and less than or equal to the resolution of the region corresponding to the ROI in the super resolution image. The number of the resolutions selected by the controller 130 and the selected resolutions may be prestored in the storage 160.

For example, the controller 130 may select n different resolutions that are greater than the resolution of the region extracted from the first image and less than or equal to the resolution of the region corresponding to the ROI in the super resolution image. Herein, n may be 5. The selected five resolutions may be a resolution A, a resolution B, a resolution C, a resolution D, and a resolution E. The resolution E may be substantially equal to the resolution of the region corresponding to the ROI in the super resolution image. Therefore, the resolution A, the resolution B, the resolution C, and the resolution D may be greater than the resolution of the extracted from the first image and less than the resolution of the region corresponding to the ROI in the super resolution image.

The controller 130 may upscale the region extracted from the first region to the resolution A. In addition, the controller 130 may downscale the region corresponding to the ROI in the super resolution image to the resolution A. The controller 130 may calculate the restoration data with respect to the resolution A by comparing the upscaled region and the downscaled region.

The controller 130 may upscale the region extracted from the first region to the resolution B. In addition, the controller 130 may downscale the region corresponding to the ROI in the super resolution image to the resolution B. The controller 130 may calculate the restoration data with respect to the resolution B by comparing the upscaled region and the downscaled region.

The controller 130 may upscale the region extracted from the first region to the resolution C. In addition, the controller 130 may downscale the region corresponding to the ROI in the super resolution image to the resolution C. The controller 130 may calculate the restoration data with respect to the resolution C by comparing the upscaled region and the downscaled region.

The controller 130 may upscale the region extracted from the first region to the resolution D. In addition, the controller 130 may downscale the region corresponding to the ROI in the super resolution image to the resolution D. The controller 130 may calculate the restoration data with respect to the resolution D by comparing the upscaled region and the downscaled region.

The controller 130 may upscale the region extracted from the first region to the resolution E. The controller 130 may calculate the restoration data with respect to the resolution E by comparing the upscaled region and the region corresponding to the ROI in the super resolution image. Accordingly, n different sets of pieces of restoration data may be calculated.

In addition, a plurality of ROIs may be included in the first image, and the controller 130 may repeat the above-described process on the respective ROIs. When three ROIs are included in the first image, 3n different sets or pieces of restoration data may be calculated.

Figure 22:
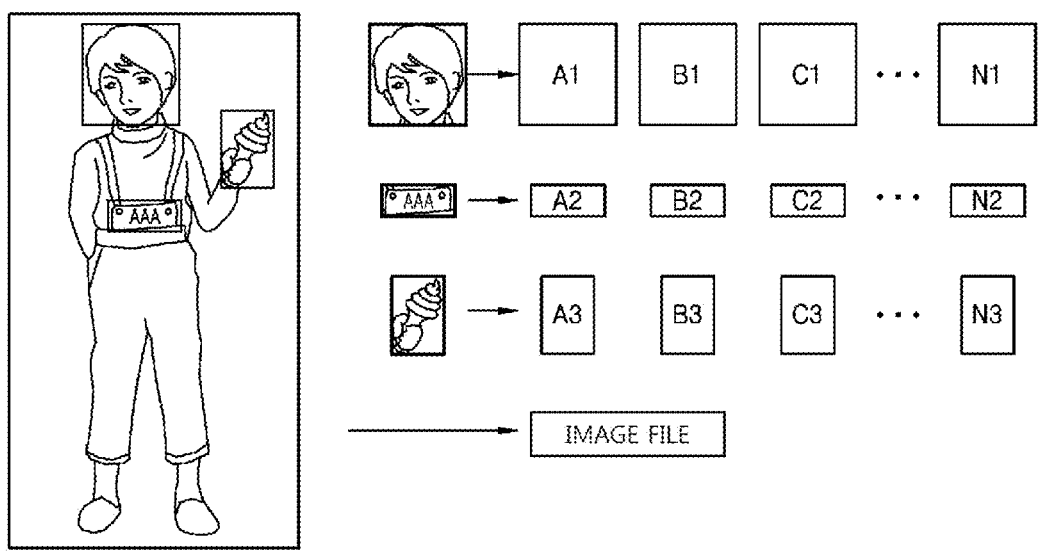
FIG. 22 is a reference diagram for describing a process of storing a first image and restoration data, according to an exemplary embodiment.

In operation S700, the first image and the restoration data may be stored. FIG. 22 is a reference diagram for describing the process of storing the first image and the restoration data, according to an exemplary embodiment. Referring to FIG. 22, the storage 160 may store the first image in an image file format. For example, the storage 160 may store the first image in an image file of a JPEG format or a PNG format, or any other desired file format.

In addition, the storage 160 may store the restoration data. As illustrated in FIG. 22, the storage 160 may separately store the 3n different sets or pieces of restoration data. The storage 160 may store the restoration data as marker data of an application. According to another exemplary embodiment, the controller 130 may compress the restoration data by using a standard JPEG encoding algorithm. The storage 160 may store the compressed restoration data as marker data of an application. According to another exemplary embodiment, the storage 160 may store the compressed restoration data as separate image files. When the restoration data is compressed, it is possible to reduce a size of an additional storage space necessary for storing the restoration data.

Figure 23:
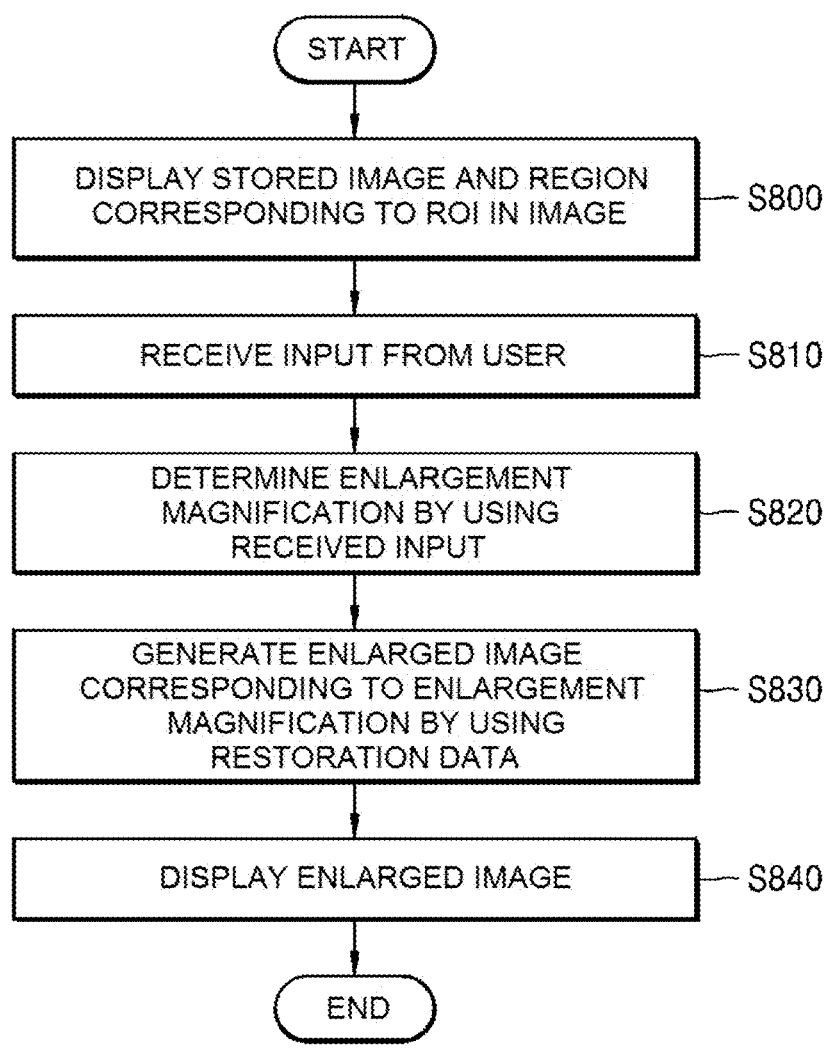
FIG. 23 is a flowchart of a process of generating and displaying an enlarged image by using restoration data, according to an exemplary embodiment.

FIG. 23 is a flowchart of a process of generating and displaying an enlarged image by using restoration data, according to an exemplary embodiment. Referring to FIG. 23, in operation S800, a stored image and a region corresponding to an ROI in the image may be displayed. For example, a stored image may be displayed, and an ROI can be indicated on the stored image using an indicator. The display 140 may display the first image stored in the storage 160 and the region corresponding to the ROI in the first image.

Figure 24:
FIG. 24 illustrates a screen displayed when a touch input is received from a user with respect to one thumbnail in a gallery screen displayed on an image processing apparatus, according to an exemplary embodiment.

Before the display 140 displays the first image and the region corresponding to the ROI, the controller 130 may execute a gallery application. The display 140 may display a gallery screen including a plurality of thumbnails corresponding to the plurality of images stored in the storage 160. The input interface 150 may receive a user's touch input on one thumbnail in the gallery screen. FIG. 24 illustrates a screen displayed when a touch input is received from a user with respect to one thumbnail in the gallery screen displayed on the image processing apparatus 100.

The display 140 may display the image corresponding to the thumbnail and the region corresponding to the ROI in the image in response to the received touch input. For example, the user may perform a touch input on the thumbnail corresponding to the first image in the gallery screen. As illustrated in FIG. 16, the display 140 may display the first image and the region corresponding to the ROI in the first image in response to the touch input.

Figure 25:
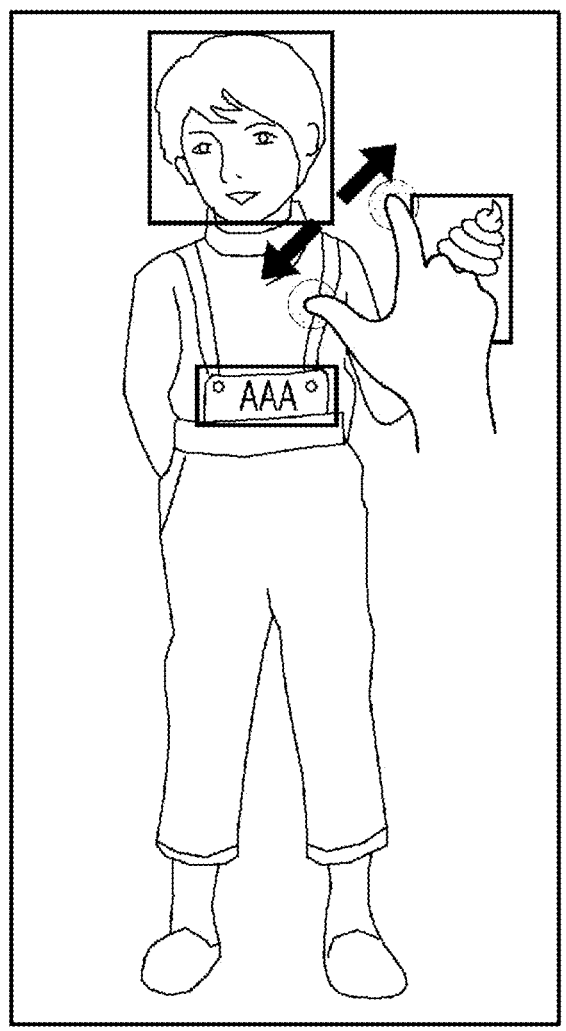
FIG. 25 illustrates a screen displayed when a pinch-out input is received from a user with respect to an image displayed on an image processing apparatus, according to an exemplary embodiment.

Referring to FIG. 23 again, in operation S810, an input may be received from the user. The user may perform a pinch-out input so as to enlarge the image displayed on the display 140. FIG. 25 illustrates a screen displayed when a pinch-out input is received from the user with respect to an image displayed on the image processing apparatus 100. Referring to FIG. 25, the user may perform a pinch-out input on a face part included in the first image. The input interface 150 may receive the pinch-out input from the user.

Figure 26:
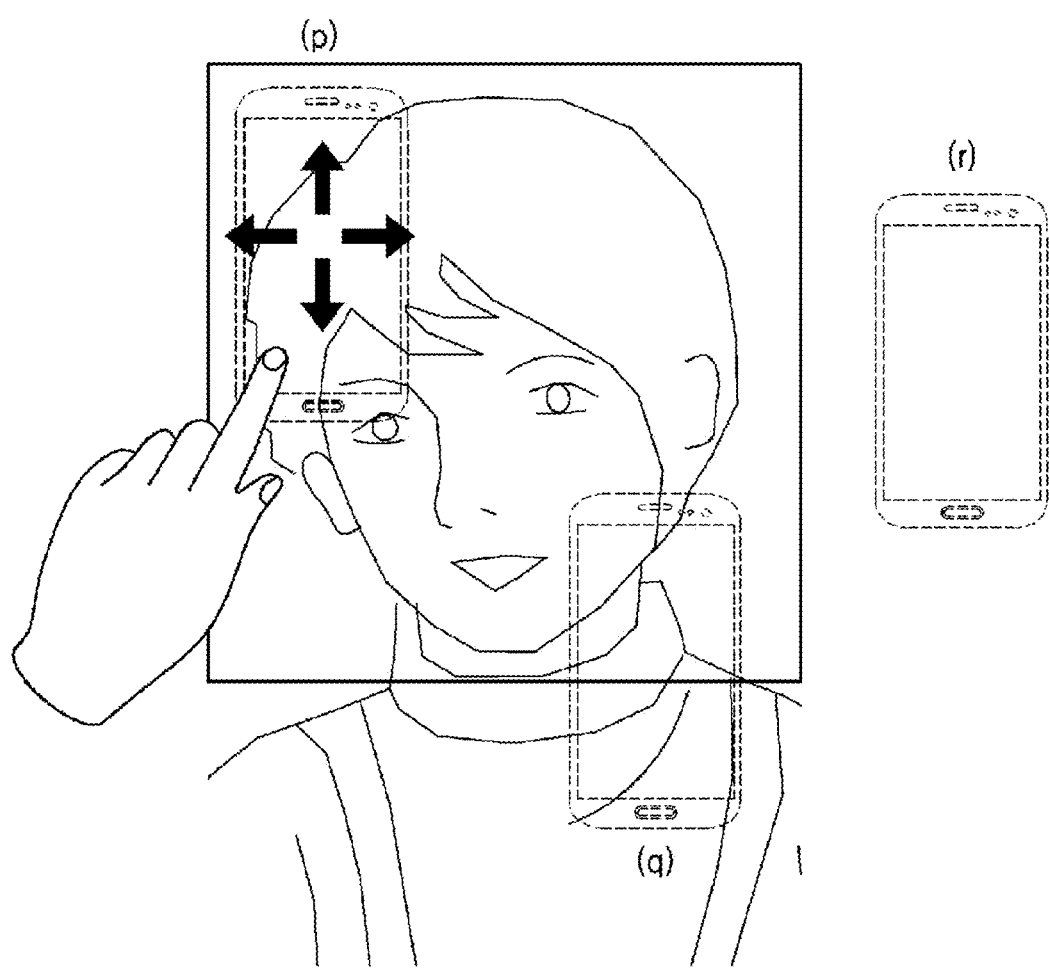
FIG. 26 illustrates a screen displayed when a drag input is received from a user with respect to an image displayed on an image processing apparatus, according to an exemplary embodiment.

In addition, the user may perform a drag input so as to pan or navigate the image displayed on the display 140. FIG. 26 illustrates a screen displayed when the drag input is received from the user with respect to the image displayed on the image processing apparatus 100. Referring to portion (p) of FIG. 26, the display 140 may already enlarge and display the face part included in the first image. As illustrated in portion (q) or (r) of FIG. 26, the user may perform the drag input so as to display another portion of the first image. The input interface 150 may receive the drag input from the user.

Referring to FIG. 23 again, in operation S820, an enlargement magnification may be determined by using the received input. The controller 130 may determine the enlargement magnification in response to the received pinch-out input. As the user pinches his/her fingers apart so as to perform the pinch-out input, the controller 130 may determine a higher enlargement magnification. The controller 130 may determine, for example, a rational number greater than 1 as the enlargement magnification.

In operation S830, an enlarged image corresponding to the enlargement magnification may be generated by using restoration data indicating a difference between the region corresponding to the ROI in the image and the region corresponding to the ROI in the super resolution image. The controller 130 may generate the enlarged image corresponding to the enlargement magnification by using the restoration data stored in the storage 160.

Figure 27:
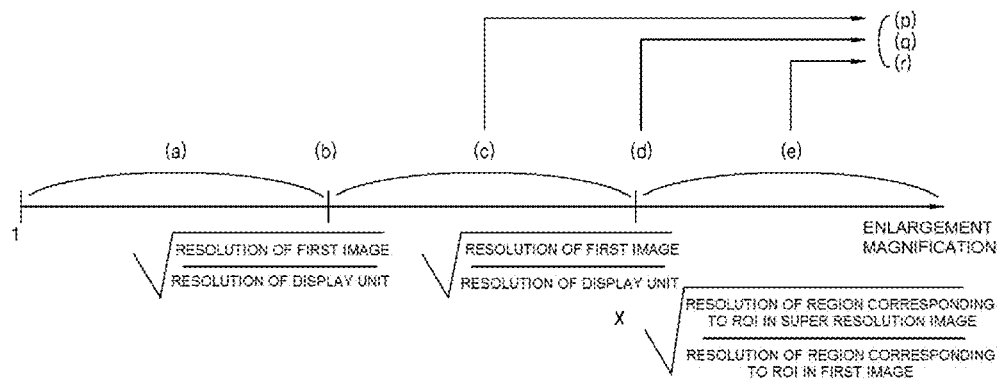
FIG. 27 is a reference diagram for describing a process of generating an enlarged image corresponding to an enlargement magnification by using restoration data, according to an exemplary embodiment.

FIG. 27 is a reference diagram for describing the process of generating the enlarged image corresponding to the enlargement magnification by using the restoration data, according to an exemplary embodiment. Referring to FIG. 27, the determined enlargement magnification may be one of the following five cases. In the case of (a) of FIG. 27, the determined enlargement magnification may be greater than 1 and less than a square root of a quotient obtained by dividing the resolution of the first image by the resolution of the display 140. For example, the resolution of the first image may be 16 million pixels. In other words, the resolution of the raw image generated by the light receiver 110 may be 16 million pixels. In addition, the resolution of the display 140 may be 2 million pixels. Therefore, in the case of (a) of FIG. 27, the enlargement magnification may be greater than 1 and less than sqrt(16/2)=2.828 (where the notation sqrt(x) may indicate the square root of a number x).

In addition, in the case of (b) of FIG. 27, the determined enlargement magnification may be substantially equal to the square root of the quotient obtained by dividing the resolution of the first image by the resolution of the display 140. Therefore, in the case of (b) of FIG. 27, the enlargement magnification may be substantially equal to sqrt (16/2)=2.828.

In addition, in the case of (c) of FIG. 27, the determined enlargement magnification may be greater than the square root of the quotient obtained by dividing the resolution of the first image by the resolution of the display 140 and less than the product of the square root of the quotient obtained by dividing the resolution of the first image by the resolution of the display 140 and a square root of a quotient obtained by dividing a resolution of the region corresponding to the ROI in the super resolution image by a resolution of the region corresponding to the ROI in the first image. The square root of the quotient obtained by dividing the resolution of the first image by the resolution of the display 140 may be sqrt(16/ 2)=2.828. In addition, the square root of the quotient obtained by dividing the resolution of the region corresponding to the ROI in the super resolution image by the resolution of the region corresponding to the ROI in the first region may be sqrt(4/1)=2. Therefore, in the case of (c) of FIG. 27, the enlargement magnification may be greater than 2.828 and less than 2.828*2=5.656.

In addition, in the case of (d) of FIG. 27, the determined enlargement magnification may be substantially equal to the product of the square root of the quotient obtained by dividing the resolution of the first image by the resolution of the display 140 and the square root of the quotient obtained by dividing the resolution of the region corresponding to the ROI in the super resolution image by the resolution of the region corresponding to the ROI in the first image. Therefore, in the case of (d) of FIG. 27, the enlargement magnification may be substantially equal to 5.656.

In addition, in the case of (e) of FIG. 27, the determined enlargement magnification may be greater than the product of the square root of the quotient obtained by dividing the resolution of the first image by the resolution of the display 140 and the square root of the quotient obtained by dividing the resolution of the region corresponding to the ROI in the super resolution image by the resolution of the region corresponding to the ROI in the first image. Therefore, in the case of (e) of FIG. 27, the enlargement magnification may be greater than 5.656.

The resolution of the enlarged image corresponding to the determined enlargement magnification may be calculated by the product of the resolution of the display 140 and the square of the determined enlargement magnification. In the case of (a) of FIG. 27, the resolution of the enlarged image corresponding to the enlargement magnification may be greater than the resolution of the display 140 and less than the resolution of the first image. The controller 130 may generate the enlarged image by downscaling the first image to the resolution of the enlarged image corresponding to the enlargement magnification. According to another exemplary embodiment, the controller 130 may generate the enlarged image by downscaling only a portion of the first image to be displayed by the display 140. In the case of (b) of FIG. 27, the resolution of the enlarged image corresponding to the enlargement magnification may be substantially equal to the resolution of the first image. The controller 130 may designate the first image as the enlarged image. According to another exemplary embodiment, the controller 130 may generate the enlarged image by cropping only a portion of the first image to be displayed by the display 140.

In the case of (c) of FIG. 27, the resolution of the enlarged image corresponding to the enlargement magnification may be greater than the resolution of the first image and less than the product of the resolution of the first image and the quotient obtained by dividing the resolution of the region corresponding to the ROI in the super resolution image by the resolution of the region corresponding to the ROI in the first image. Since the quotient obtained by dividing the resolution of the region corresponding to the ROI in the super resolution image by the resolution of the region corresponding to the ROI in the first image is 4, the resolution of the enlarged image may be greater than the resolution of the first image and less than four times the resolution of the first image.

In addition, in the case of (c) of FIG. 27, the portion of the enlarged image to be displayed by the display 140 may be any one of the following three cases. As in the case of (p) of FIG. 26, the entire portion to be displayed by the display 140 may correspond to the ROI. In addition, as in the case of (q) of FIG. 26, a part of the portion to be displayed by the display 140 may correspond to the ROI and another part of the portion to be displayed by the display 140 may not correspond to the ROI. In addition, as in the case of (r) of FIG. 26, the entire portion to be displayed by the display 140 may not correspond to the ROI.

In the case of (c) of FIG. 27 and (p) of FIG. 26, the controller 130 may upscale the region corresponding to the ROI in the first image. According to another exemplary embodiment, the controller 130 may upscale only the portion of the first image to be displayed by the display 140. The controller 130 may generate the enlarged image by using the upscaled partial image and the restoration data stored in the storage 160. The controller 130 may synthesize, which in some exemplary embodiments may mean combine, the portion corresponding to the enlargement magnification among the restoration data stored in the storage 160 and the upscaled partial image with the upscaled partial image.

For example, the controller 130 may determine that the restoration data about the resolution B among the stored restoration data corresponds to the enlargement magnification. The controller 130 may synthesize the portion corresponding to the upscaled partial image in the restoration data about the resolution B with the upscaled partial image. Since the restoration data indicates the difference between the region extracted from the first image and the region corresponding to the extracted region in the super resolution image, the super resolution image corresponding to the upscaled partial image may be generated by the synthesis.

In the case of (c) of FIG. 27 and (q) of FIG. 26, the controller 130 may upscale only the portion of the first image to be displayed by the display 140. The controller 130 may generate a first partial image by upscaling a portion corresponding to the ROI in the portion to be displayed by the display 140. In addition, the controller 130 may generate a second partial image by upscaling another portion not corresponding to the ROI in the portion to be displayed by the display 140. The controller 130 may synthesize the portion corresponding to the enlargement magnification among the restoration data stored in the storage 160 and the first partial image with the first partial image. The super resolution partial image corresponding to the first partial image may be generated by the synthesis. The controller 130 may generate the enlarged image by combining the super resolution partial image with the second partial image.

In the case of (c) of FIG. 27 and (r) of FIG. 26, the controller 130 may generate the enlarged image by upscaling only the portion of the first image to be displayed by the display 140.

In the case of (d) of FIG. 27, the resolution of the enlarged image corresponding to the enlargement magnification may be substantially equal to the product of the resolution of the first image and the quotient obtained by dividing the resolution of the region corresponding to the ROI in the super resolution image by the resolution of the region corresponding to the ROI in the first image. Since the quotient obtained by dividing the resolution of the region corresponding to the ROI in the super resolution image by the resolution of the region corresponding to the ROI in the first image is 4, the resolution of the enlarged image may be substantially equal to four times the resolution of the first image.

In addition, in the case of (d) of FIG. 27, the portion of the enlarged image to be displayed by the display 140 may be any one of the following three cases. As in the case of (p) of FIG. 26, the entire portion to be displayed by the display 140 may correspond to the ROI. In addition, as in the case of (q) of FIG. 26, a part of the portion to be displayed by the display 140 may correspond to the ROI and another part of the portion to be displayed by the display 140 may not correspond to the ROI. In addition, as in the case of (r) of FIG. 26, the entire portion to be displayed by the display 140 may not correspond to the ROI.

In the case of (d) of FIG. 27 and (p) of FIG. 26, the controller 130 may upscale the region corresponding to the ROI in the first image. According to another exemplary embodiment, the controller 130 may upscale only the portion of the first image to be displayed by the display 140. The controller 130 may generate the enlarged image by using the upscaled partial image and the restoration data stored in the storage 160. The controller 130 may synthesize the portion corresponding to the enlargement magnification among the restoration data stored in the storage 160 and the upscaled partial image with the upscaled partial image.

For example, the controller 130 may determine that the restoration data about the resolution E among the stored restoration data corresponds to the enlargement magnification. The controller 130 may synthesize the portion corresponding to the upscaled partial image in the restoration data about the resolution E with the upscaled partial image. Since the restoration data indicates the difference between the region extracted from the first image and the region corresponding to the extracted region in the super resolution image, the super resolution partial image corresponding to the upscaled partial image may be generated by the synthesis.

In the case of (d) of FIG. 27 and (q) of FIG. 26, the controller 130 may upscale only the portion of the first image to be displayed by the display 140. The controller 130 may generate a first partial image by upscaling a portion corresponding to the ROI in the portion to be displayed by the display 140. In addition, the controller 130 may generate a second partial image by upscaling another portion not corresponding to the ROI in the portion to be displayed by the display 140. The controller 130 may synthesize the portion corresponding to the enlargement magnification among the restoration data stored in the storage 160 and the first partial image with the first partial image. The super resolution partial image corresponding to the first partial image may be generated by the synthesis. The controller 130 may generate the enlarged image by combining the super resolution partial image with the second partial image.

In the case of (d) of FIG. 27 and (r) of FIG. 26, the controller 130 may generate the enlarged image by upscaling only the portion of the first image to be displayed by the display 140.

In the case of (e) of FIG. 27, the resolution of the enlarged image corresponding to the enlargement magnification may be greater than the product of the resolution of the first image and the quotient obtained by dividing the resolution of the region corresponding to the ROI in the super resolution image by the resolution of the region corresponding to the ROI in the first image. Since the quotient obtained by dividing the resolution of the region corresponding to the ROI in the super resolution image by the resolution of the region corresponding to the ROI in the first image is 4, the resolution of the enlarged image may be greater than four times the resolution of the first image.

In addition, in the case of (e) of FIG. 27, the portion of the enlarged image to be displayed by the display 140 may be any one of the following three cases. As in the case of (p) of FIG. 26, the entire portion to be displayed by the display 140 may correspond to the ROI. In addition, as in the case of (q) of FIG. 26, a part of the portion to be displayed by the display 140 may correspond to the ROI and another part of the portion to be displayed by the display 140 may not correspond to the ROI. In addition, as in the case of (r) of FIG. 26, the entire portion to be displayed by the display 140 may not correspond to the ROI.

In the case of (e) of FIG. 27 and (p) of FIG. 26, the controller 130 may upscale the region corresponding to the ROI in the first image. According to another exemplary embodiment, the controller 130 may upscale only the portion of the first image to be displayed by the display 140. The controller 130 may generate the enlarged image by using the upscaled partial image and the restoration data stored in the storage 160. The controller 130 may synthesize the portion corresponding to the enlargement magnification among the restoration data stored in the storage 160 and the upscaled partial image with the upscaled partial image.

For example, the controller 130 may synthesize the portion corresponding to the upscaled partial image in the restoration data about the resolution E with the upscaled partial image. Since the restoration data indicates the difference between the region extracted from the first image and the region corresponding to the extracted region in the super resolution image, the super resolution partial image corresponding to the upscaled partial image may be generated by the synthesis. The controller 130 may generate the enlarged image corresponding to the enlargement magnification by upscaling the super resolution partial image by using the bicubic interpolation.

In the case of (e) of FIG. 27 and (q) of FIG. 26, the controller 130 may upscale only the portion of the first image to be displayed by the display 140. The controller 130 may generate a first partial image by upscaling a portion corresponding to the ROI in the portion to be displayed by the display 140. In addition, the controller 130 may generate a second partial image by upscaling another portion not corresponding to the ROI in the portion to be displayed by the display 140. The controller 130 may synthesize the portion corresponding to the enlargement magnification among the restoration data stored in the storage 160 and the first partial image with the first partial image. The super resolution partial image corresponding to the first partial image may be generated by the synthesis. The controller 130 may combine the generated super resolution partial image with the second partial image. The controller 130 may generate the enlarged image corresponding to the enlargement magnification by upscaling the combined image by using the bicubic interpolation.

In the case of (e) of FIG. 27 and (r) of FIG. 26, the controller 130 may generate the enlarged image by upscaling only the portion of the first image to be displayed by the display 140.

Figure 28:
FIG. 28 illustrates a screen showing a result obtained when an enlarged image is displayed, according to an exemplary embodiment.
Figure 29:
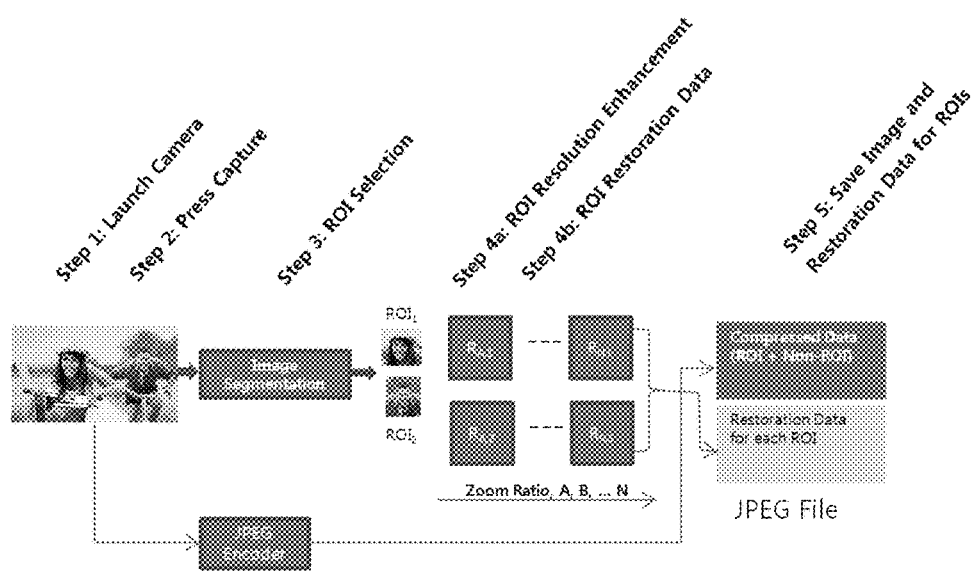
FIG. 29 is a reference diagram for describing a process of an image processing method, according to an exemplary embodiment.
Figure 30:
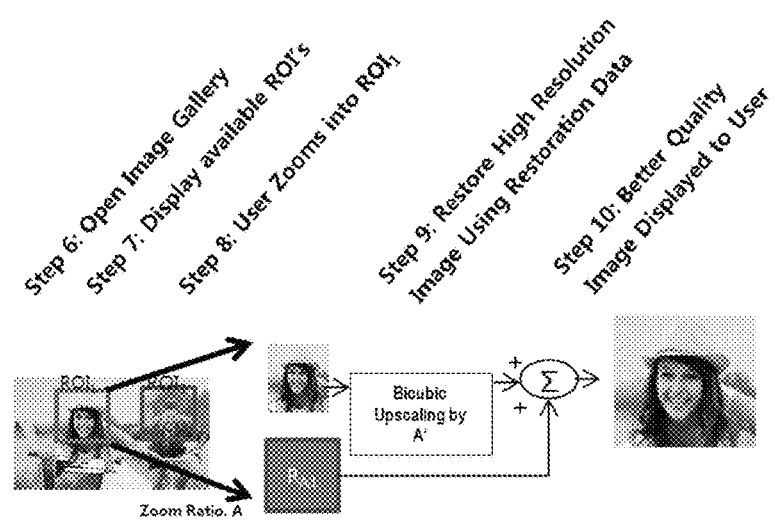
FIG. 30 is another reference diagram for describing a process of an image processing method, according to an exemplary embodiment.
Figure 31:
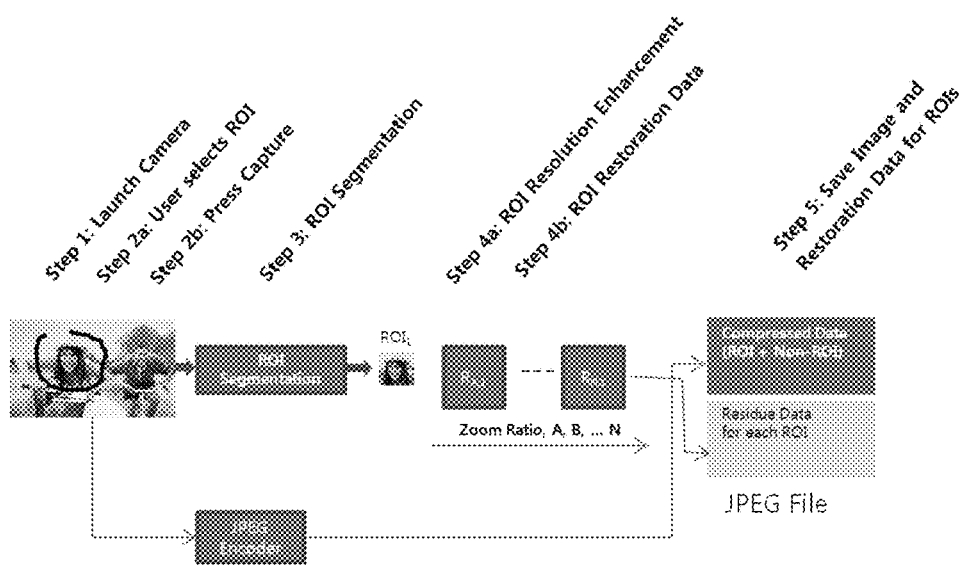
FIG. 31 is a reference diagram for describing a process of an image processing method, according to another exemplary embodiment.
Figure 32:
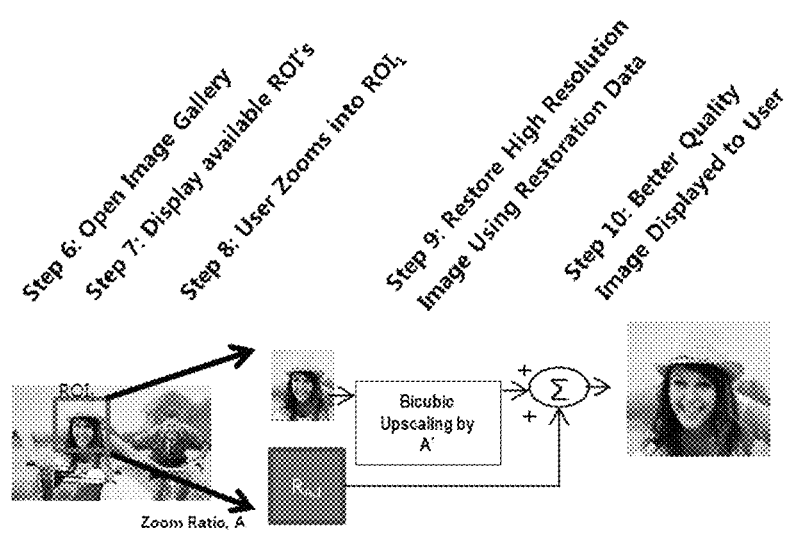
FIG. 32 is another reference diagram for describing a process of an image processing method, according to another exemplary embodiment.

Referring to FIG. 23 again, in operation S840, the enlarged image may be displayed. The display 140 may display the enlarged image generated by the controller 130. FIG. 28 illustrates a screen showing a result obtained when an enlarged image is displayed, according to an exemplary embodiment.

For example, in a case where the resolution of the first image is 16 million pixels and the resolution of the display is 2 million pixels, a maximum enlargement magnification, which is capable of displaying an image without deterioration of the image quality, may be sqrt(16/2)=2.828. According to the above-described exemplary embodiments, when the first image is enlarged in excess of 2.828 times, it is possible to display the super resolution image or the image upscaled from the super resolution image. Therefore, it is possible to improve image quality when the enlarged image is displayed.

In addition, according to the above-described exemplary embodiments, since only the ROI in the image is processed, the time necessary for the imaging processing may be reduced. In addition, the size of the memory necessary for the imaging processing may be reduced. In addition, the size of the storage space necessary for storing the result of the imaging processing may be reduced.

Furthermore, according to the above-described exemplary embodiments, the restoration data indicating the difference between the region corresponding to the ROI in the first image and the region corresponding to the ROI in the super resolution image may be stored, instead of storing the super resolution image. The restoration data may be compressed and stored. Moreover, it is possible to restore the super resolution image of the ROI by using the stored restoration data. Therefore, it is possible to reduce the size of the additional storage space necessary for improving the quality of the image.

Exemplary embodiments may be embodied in a storage medium including instruction codes executable by a computer, such as a program module executed by the computer. A computer-readable medium may be any available medium which is accessible by the computer and may include any volatile/non-volatile media and any removable/non-removable media. Furthermore, the computer-readable medium may include any computer storage and communication media. The computer storage medium may include any volatile/non-volatile and removable/non-removable media embodied by a certain method or technology for storing information such as computer-readable instruction code, a data structure, a program module, or other data. The communication medium may typically include the computer-readable instruction code, the data structure, the program module, or other data of a modulated data signal such as a carrier wave, or other transmission mechanism, and may include any information transmission medium.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An image processing method comprising:
    storing an image and restoration data, wherein the restoration data indicates a difference between at least one region of the image and at least one region of a super resolution image corresponding to the at least one region of the image;
    displaying the stored image;
    selecting a region from among the at least one region of the image in response to an input;
    determining a magnification for the selected region;
    obtaining target restoration data corresponding to the selected region from the restoration data based on the determined magnification;
    generating an enlarged image according to the determined magnification based on the stored image and the target restoration data corresponding to the selected region; and
    displaying the enlarged image,
    wherein the enlarged image is generated by scaling up the image and processing the scaled image with the target restoration data corresponding to the selected region,
    wherein the enlarged image has at least one resolution which is greater than a resolution of the stored image, and
    wherein the restoration data includes a first restoration data set having a first resolution, and a second restoration data set having a second resolution different from the first resolution.

2. An image processing apparatus comprising:
    a storage configured to store an image and restoration data, wherein the restoration data indicates a difference between at least one region of the image and at least one region of a super resolution image corresponding to the at least one region of the image;
    a display configured to display the stored image; and
    at least one processor configured to select a region from among the at least one region of the image in response to an input, determine a magnification for the selected region, obtain target restoration data corresponding to the selected region from the restoration data based on the determined magnification, and generate an enlarged image according to the determined magnification based on the stored image and the target restoration data corresponding to the selected region,
    wherein the display is further configured to display the enlarged image,
    wherein the enlarged image is generated by scaling up the image and processing the scaled image with the target restoration data corresponding to the selected region,
    wherein the enlarged image has at least one resolution which is greater than a resolution of the stored image, and
    wherein the restoration data includes a first restoration data set having a first resolution, and a second restoration data set o having a second resolution different from the first resolution.

3. The image processing method of claim 1, wherein the determining the magnification comprises
    determining the magnification for the selected region based on a resolution of a display and the input.

4. The image processing method of claim 1, wherein the generating the enlarged image further comprises:
    if the magnification is greater than 1 and less than a square root of a quotient obtained by dividing the resolution of the stored image by a resolution of a display, generating the enlarged image by downscaling a portion of a third image to be displayed; and
    if the magnification is substantially equal to the square root of the quotient obtained by dividing the resolution of the stored image by the resolution of the display, generating the enlarged image by cropping a portion of the stored image to be displayed.

5. The image processing method of claim 1, wherein the generating the enlarged image further comprises:
    if the magnification is greater than a square root of a first quotient obtained by dividing the resolution of the stored image by a resolution of a display, and less than a product of the square root of the first quotient and a square root of a second quotient obtained by dividing a resolution of a region of the super resolution image corresponding to the selected region by a resolution of the selected region of the stored image, generating a partial image by upscaling a portion of the image to be displayed; and
    generating the enlarged image by synthesizing the target restoration data with the partial image.

6. The image processing method of claim 1, wherein the generating the enlarged image comprises:
    if the magnification is greater than a square root of a quotient obtained by dividing a resolution of the stored image by a resolution of a display and less than a product of the square root of the quotient obtained by dividing the resolution of the stored image by the resolution of the display and a square root of a quotient obtained by dividing a resolution of a region of the super resolution image corresponding to the selected region by a resolution of the selected region of the stored image, generating a first partial image by upscaling a first portion of the image, the first portion corresponding to one of the at least one region of the image;
    generating a second partial image by upscaling a second portion of the stored image, the second portion not corresponding to the one of the at least one region of the image;

generating a super resolution partial image by synthesizing the target restoration data with the first partial image; and generating the enlarged image by combining the super resolution partial image with the second partial image.

7. The image processing method of claim 1, wherein the generating the enlarged image comprises:
if the magnification is greater than a product of a square root of a quotient obtained by dividing a resolution of the stored image by a resolution of a display and a square root of a quotient obtained by dividing a resolution of a region of the super resolution image corresponding to the selected region by a resolution of the selected region of the stored image, generating a partial image by upscaling a portion of the image;
generating a synthesized image by synthesizing the target restoration data with the partial image; and
generating the enlarged image by upscaling the synthesized image.

8. The image processing method of claim 1, wherein the restoration data is obtained by comparing the at least one region of the image and the at least one region of the super resolution image corresponding to the at least one region of the image,
wherein the super resolution image is obtained based on a plurality of images.

9. The image processing method of claim 1,
wherein the displaying the stored image further comprises displaying at least one indicator, wherein each indicator of the at least one indicator indicates one of the at least one region of the image, and
wherein the selected region corresponds to one of the at least one indicator selected based on the input.

10. The image processing method of claim 1, wherein the restoration data is obtained by scaling at least one of a region of the image and a region of the super resolution image corresponding to the region of the image, and comparing the region of the image and the region of the super resolution image after the scaling.

11. The image processing apparatus of claim 2, wherein the restoration data is obtained by scaling at least one of a region of the image and a region of the super resolution image corresponding to the region of the image, and comparing the region of the image and the region of the super resolution image after the scaling.

12. The image processing apparatus of claim 2, wherein the at least one processor is configured to determine the magnification for the selected region based on a resolution of a display and the input.

13. The image processing apparatus of claim 2, wherein the at least one processor is configured to generate the enlarged image by:
generating a partial image by upscaling a portion of the image to be displayed, and
generating the enlarged image by synthesizing the target restoration data with the partial image.

14. The image processing apparatus of claim 2, wherein the at least one processor is configured to generate the enlarged image by:
generating a first partial image by upscaling a first portion of the image, the first portion corresponding to one of the at least one region of the image,
generating a second partial image by upscaling a second portion of the stored image, the second portion not corresponding to the one of the at least one region of the image, generating a super resolution partial image by synthesizing the target restoration data with the first partial image, and generating the enlarged image by combining the super resolution partial image with the second partial image.

15. The image processing apparatus of claim 2, wherein the restoration data is obtained by comparing the at least one region of the image and the at least one region of the super resolution image corresponding to the at least one region of the image,
wherein the super resolution image is obtained based on a plurality of images.

16. The image processing apparatus of claim 2, wherein the display is configured to display at least one indicator on the image, wherein each indicator of the at least one indicator indicates one of the at least one region of the image, and
wherein the selected region corresponds to one of the at least one indicator selected based on the input.

17. The image processing method of claim 1, wherein:
the restoration data includes a plurality of partial restoration data sets, each of the partial restoration data sets has at least one partial restoration data,
the at least one partial restoration data corresponds to the at least one region of the image, and
resolutions of the plurality of partial restoration data sets are different from each other.

18. The image processing method of claim 1, wherein:
the restoration data includes a plurality of partial restoration data,
each of the plurality of partial restoration data corresponds to each of the at least one region of the image, and
resolutions of at least a portion of the plurality of partial restoration data are different from each other.

19. The image processing method of claim 1, wherein:
the restoration data includes a plurality of partial restoration data for the at least one region of the image,
each of at least one region among the at least one region of the image corresponds multiple partial restoration data, and
resolutions of the multiple partial restoration data are different from each other.

20. The image processing method of claim 1, wherein the obtaining the target restoration data comprises obtaining the target restoration data from the restoration data according to a resolution of the enlarged image corresponding to the determined magnification.

21. The image processing method of claim 20, wherein the obtaining the target restoration data comprises determining the target restoration data among multiple partial restoration data corresponding to the selected region, according to the resolution of the enlarged image corresponding to the determined magnification, the multiple partial restoration data is included in the restoration data.

22. The image processing method of claim 20, wherein the obtaining the target restoration data comprises obtaining the target restoration data by processing a portion of the restoration data corresponding to the selected region according to the resolution of the enlarged image corresponding to the determined magnification.

23. The image processing method of claim 1, wherein the enlarged image is generated by:
generating a first partial image by upscaling a first portion of the image, the first portion corresponding to one of the at least one region of the image, generating a second partial image by upscaling a second portion of the stored image, the second portion not corresponding to the one of the at least one region of the image, generating a super resolution partial image by synthesizing the target restoration data with the first partial image, and generating the enlarged image by combining the super resolution partial image with the second partial image.

24. The image processing apparatus of claim 2, wherein:
the restoration data includes a plurality of partial restoration data sets,
each of the partial restoration data sets has at least one partial restoration data,
the at least one partial restoration data corresponds to the at least one region of the image, and
resolutions of the plurality of partial restoration data sets are different from each other.

25. The image processing apparatus of claim 2, wherein:
the restoration data includes a plurality of partial restoration data,
each of the plurality of partial restoration data corresponds to each of the at least one region of the image, and
resolutions of at least portion of the plurality of partial restoration data are different from each other.

26. The image processing apparatus of claim 2, wherein:
the restoration data includes a plurality of partial restoration data for the at least one region of the image,
each of at least one region among the at least one region of the image corresponds multiple partial restoration data, and
wherein resolutions of the multiple partial restoration data are different from each other.

27. The image processing apparatus of claim 2, wherein the at least one processor is configured to obtain the target restoration data from the restoration data according to a resolution of the enlarged image corresponding to the determined magnification.

28. The image processing apparatus of claim 27, wherein the at least one processor is configured to determine the target restoration data among multiple partial restoration data corresponding to the selected region, according to the resolution of the enlarged image corresponding to the determined magnification, and the multiple partial restoration data is included in the restoration data.

29. The image processing apparatus of claim 27, wherein the at least one processor is configured to obtain the target restoration data by processing a portion of the restoration data corresponding to the selected region according to the resolution of the enlarged image corresponding to the determined magnification.

* * * * *